US012393967B1

(12) United States Patent
Mao et al.

(10) Patent No.: US 12,393,967 B1
(45) Date of Patent: Aug. 19, 2025

(54) MACRO-ATTRIBUTION

(71) Applicant: Reputation.com, Inc., San Ramon, CA (US)

(72) Inventors: Dean Mao, San Francisco, CA (US); Thomas Medina, Whittier, CA (US); Bradley William Null, Millbrae, CA (US); Lara Stoll, Berkeley, CA (US); Hao Xu, Newark, CA (US)

(73) Assignee: Reputation.com, Inc., San Ramon, CA (US)

( * ) Notice: Subject to any disclaimer, the term of this patent is extended or adjusted under 35 U.S.C. 154(b) by 409 days.

(21) Appl. No.: 17/592,205

(22) Filed: Feb. 3, 2022

Related U.S. Application Data

(60) Provisional application No. 63/145,623, filed on Feb. 4, 2021.

(51) Int. Cl.
*G06Q 30/0282* (2023.01)
*G06Q 30/0201* (2023.01)
*G06Q 30/0203* (2023.01)

(52) U.S. Cl.
CPC ..... *G06Q 30/0282* (2013.01); *G06Q 30/0201* (2013.01); *G06Q 30/0203* (2013.01)

(58) Field of Classification Search
None
See application file for complete search history.

(56) References Cited

U.S. PATENT DOCUMENTS

| | | | | |
|---|---|---|---|---|
| 8,311,863 B1 * | 11/2012 | Kemp | ................ | G06Q 10/0639 705/7.29 |
| 8,407,110 B1 * | 3/2013 | Joseph | ............... | G06Q 30/0633 705/26.81 |
| 10,395,659 B2 * | 8/2019 | Piercy | ...................... | G10L 15/22 |

(Continued)

FOREIGN PATENT DOCUMENTS

WO WO-2019143445 A2 * 7/2019 ............. G05B 15/02

OTHER PUBLICATIONS

Sterling "Mere Measurement "Plus": How Solicitation of Open-Ended Positive Feedback Influences Customer Purchase Behavior" , Dec. 2016, American Marketing Association Journal of Marketing Research, pp. 1-44. (Year: 2016).*

(Continued)

*Primary Examiner* — Romain Jeanty
(74) *Attorney, Agent, or Firm* — Van Pelt, Yi & James LLP

(57) ABSTRACT

Macro-Attribution of feedback to solicitation includes determining historical time series information pertaining to collected feedback items. It further includes determining historical time series information pertaining to feedback solicitation. It further includes generating, based at least in part on the historical time series information pertaining to the collected feedback items and the historical time series information pertaining to the feedback solicitation, a macro-attribution model usable to estimate an expected number of feedback items to be received for a time period. It further includes receiving a set of feedback items for the time (Continued)

period. It further includes using the macro-attribution model to determine, for the feedback items received for the time period, an estimate of an amount of feedback that was generated organically, and an estimate of an amount of feedback that was generated by solicitation.

23 Claims, 10 Drawing Sheets

(56) References Cited

U.S. PATENT DOCUMENTS

| | | | | |
|---|---|---|---|---|
| 2002/0120554 | A1* | 8/2002 | Vega | G06Q 30/02 705/26.1 |
| 2008/0119131 | A1* | 5/2008 | Rao | G06Q 30/0217 455/3.04 |
| 2008/0301009 | A1* | 12/2008 | Plaster | G06Q 10/087 705/28 |
| 2010/0169315 | A1 | 7/2010 | Green | |
| 2013/0035975 | A1* | 2/2013 | Cavander | G06Q 30/02 705/7.22 |
| 2014/0040748 | A1* | 2/2014 | Lemay | G06F 16/9562 715/728 |
| 2014/0114876 | A1 | 4/2014 | Montano | |
| 2014/0222928 | A1 | 8/2014 | Scholtes | |
| 2014/0278769 | A1* | 9/2014 | McCandless | G06Q 30/0201 705/7.31 |
| 2015/0039521 | A1 | 2/2015 | Schubert | |
| 2015/0149315 | A1* | 5/2015 | Tischer | G06Q 50/01 705/26.1 |
| 2016/0180365 | A1* | 6/2016 | Shi | G06Q 30/0217 705/14.19 |
| 2017/0134464 | A1* | 5/2017 | Rao | H04H 60/46 |
| 2017/0220943 | A1* | 8/2017 | Duncan | G06N 5/04 |
| 2019/0122257 | A1 | 4/2019 | Cai | |
| 2019/0197456 | A1 | 6/2019 | Perumal | |
| 2020/0272975 | A1 | 8/2020 | Dumois | |
| 2020/0357030 | A1 | 11/2020 | Wagner | |
| 2021/0056600 | A1 | 2/2021 | Stretch | |
| 2022/0122134 | A1 | 4/2022 | Hoffman | |

OTHER PUBLICATIONS

Morningstar “Total Portfolio Performance Attribution Methodology”, May 2013, Morningstar Methodology Paper, pp. 1-38. (Year: 2013).*

Rosen-Zvi et al., The Author—Topic Model for Authors and Documents, 20th Conference on Uncertainty in Artificial Intelligence, Jul. 2012.

Palshikar et al., HiSPEED: A System for Mining Performance Appraisal Data and Text, 2017 International Conference on Data Science and Advanced Analytics, 2017, pp. 477-486.

* cited by examiner

MACRO-ATTRIBUTION

CROSS REFERENCE TO OTHER APPLICATIONS

This application claims priority to U.S. Provisional Patent Application No. 63/145,623 entitled ATTRIBUTION OF FEEDBACK filed Feb. 4, 2021 which is incorporated herein by reference for all purposes.

BACKGROUND OF THE INVENTION

One goal for businesses is to generate additional reviews about their business. In some cases, in order to do so, businesses will reach out to their customers after those customers have visited them, asking them for feedback and inviting them to, for example, write a review about the business. However, it can be difficult to determine the impact of solicitation on generating of reviews.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Probabilistic Feedback Attribution

Described herein are techniques for probabilistic feedback attribution. Feedback may be left on various online sites, and the identity of who is leaving the feedback is not always clear, especially in the case of feedback that originates online. Using the techniques described herein, probabilistic mapping of the feedback to individuals is performed.

Figure 1:
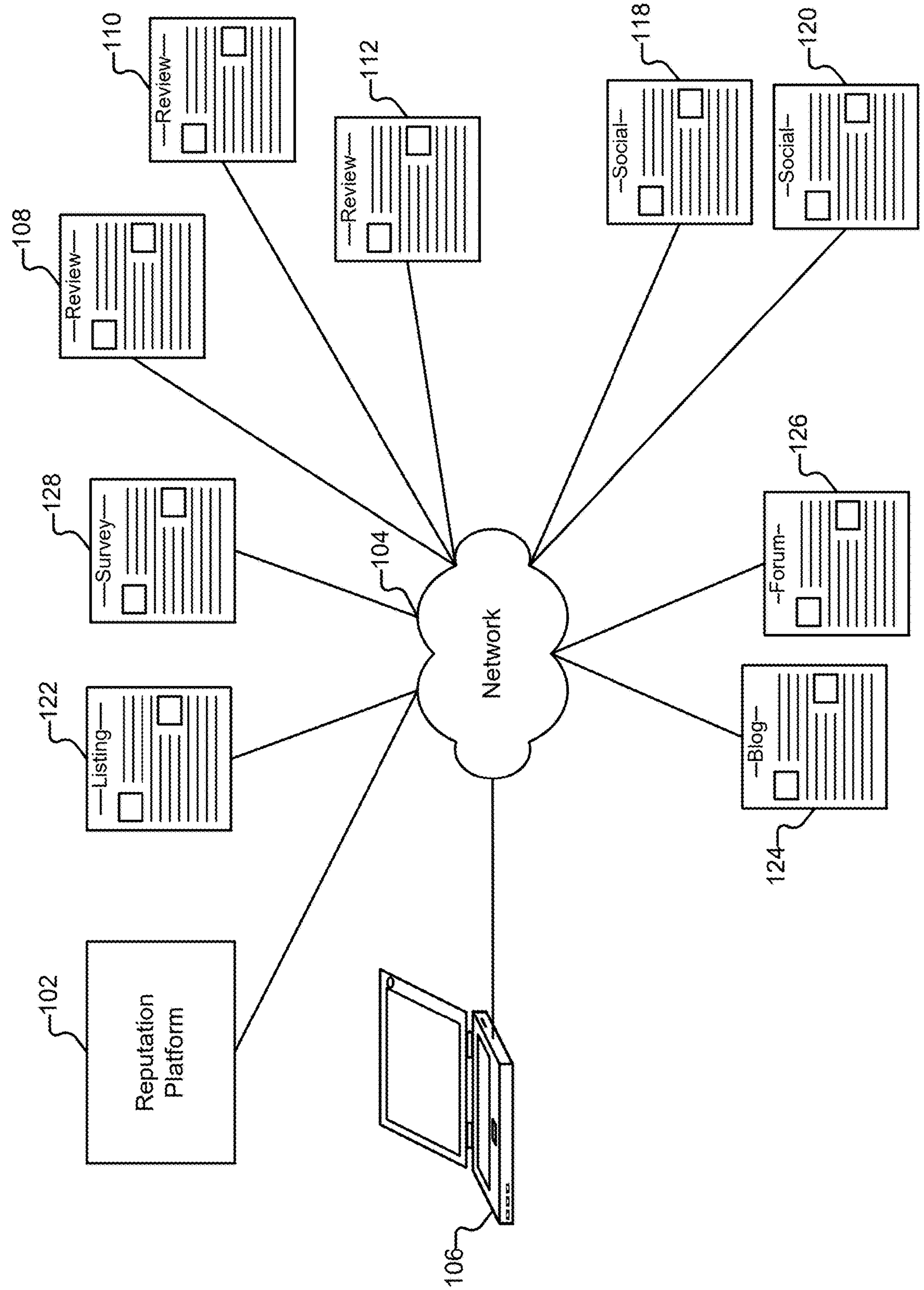
FIG. 1 illustrates an embodiment of an environment in which entity reputation information is collected, analyzed, and presented.

FIG. 1 illustrates an embodiment of an environment in which entity reputation information is collected, analyzed, and presented. In the example shown, the user of client device 106 is employed by a national chain of dealerships ("AutoBest"). As will be described in more detail below, the user can access the services of reputation platform 102 (via network 104) to track and manage the reputation of their business online. The techniques described herein can work with a variety of client devices including, but not limited to, personal computers, tablet computers, and smartphones. In this example, AutoBest is an entity that is a customer or subscriber of the services provided by platform 102. Such entities are also referred to herein as "tenants" or "rooftops," who may have one or more "locations." In the examples described herein, AutoBest is an example of a tenant or rooftop, with individual AutoBest dealerships being examples of locations.

Dealerships are but one example of an industry for which reputation management may be performed. Another example of an industry is the healthcare industry, where a tenant or rooftop is a hospital, and the locations are individuals such as physicians. While examples involving automotive dealerships are described herein for illustrative purposes, the techniques described herein may be variously adapted to accommodate other types of industries.

Reputation platform 102 is configured to collect reputation and other online feedback data from a variety of sources, including review websites 108-112, social networking websites 118-120, listing website 122, and other websites 124-126. In some embodiments, feedback data such as survey data is also provided to platform 102. In the examples described herein, review site 108 is a general purpose review site that allows users to post reviews regarding all types of businesses. Examples of such review sites include Google Places, Yahoo! Local, Citysearch, Yelp, Zagat, etc. Review sites 110-112 are specific to auto dealerships Examples of auto dealership oriented review sites are Cars.com and DealerRater.com. Examples of social networking sites 118 and 120 include Twitter, Foursquare, Facebook, etc. Social networking sites 118-120 allow users to take actions such as "checking in" to locations, "liking" locations on profile pages of the location, giving "thumbs up" or "thumbs down," etc. Listing website 122 is a directory on which businesses can list information about themselves, such as their phone number, hours of operation, website, etc. An example of a listing website is Yellowpages.com. Some sites function as multiple types (e.g., Google My Business pages).

Personal blog 124 and online forum 126 are examples of other types of websites "on the open Web" that can contain reputation information about an entity such as a business. In this example, external survey source 128 is a source external to platform 102 from which user surveys can be collected. Other examples of sources from which feedback data may be collected include repositories, homepages, websites, emails, call center recordings, cards dropped in a drop box (e.g., where the contents of physical cards may be digitized via data entry, scanning (e.g., optical character recognition (OCR), etc.), etc.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task.

As shown in the example environment of FIG. 1, there are numerous sites on which individuals may leave feedback about AutoBest and/or AutoBest dealership locations. It would be beneficial to AutoBest if it could know whether a piece of feedback left on a source site was authored or could be otherwise attributed to an individual that AutoBest had engaged or otherwise interacted with. This would have various benefits in allowing AutoBest to better understand and gain insight into their online reputation.

However, determining who left a piece of feedback can be challenging for various reasons. For example, the information associated with a piece of feedback may vary from source site to source site. For example, just with respect to names, one site might list a reviewer's full name, another source site might list only the first name with a last initial, and yet another site may not even list a real name, but merely an online nickname. Further, there may be multiple people with the same name on a source site. As yet another example, a piece of feedback may not even have been left by someone who interacted with an AutoBest dealership. For example, in some cases, such as on social network sites, one person leaving negative feedback about a location may prompt other users (e.g., friends) to replicate the feedback or post their own negative feedback, even if those other people had never interacted with the location. As yet another example of a challenge, some feedback may be fake, where a competitor is writing fake reviews about themselves and/or other entities. Thus, for the above and other reasons, it may be challenging for entities such as AutoBest to determine to whom a piece of feedback is attributed.

Such challenges may be addressed using the probabilistic feedback attribution techniques described herein. In some embodiments, using the techniques described herein, AutoBest performs a probabilistic mapping of a piece of feedback to individuals. For example, using the techniques described herein, AutoBest may determine, for the piece of feedback, the probability that a given individual that is known to AutoBest left that piece of feedback. The probability that none of the individuals known to AutoBest left that piece of feedback may also be determined. Further, using the techniques described herein may be used by AutoBest to better understand who is leaving feedback for another entity, such as a competitor.

While examples involving auto dealerships are described herein for illustrative purposes, the feedback attribution techniques described herein may be variously adapted to accommodate entities belonging to any other type of industry, as appropriate.

Figure 2:
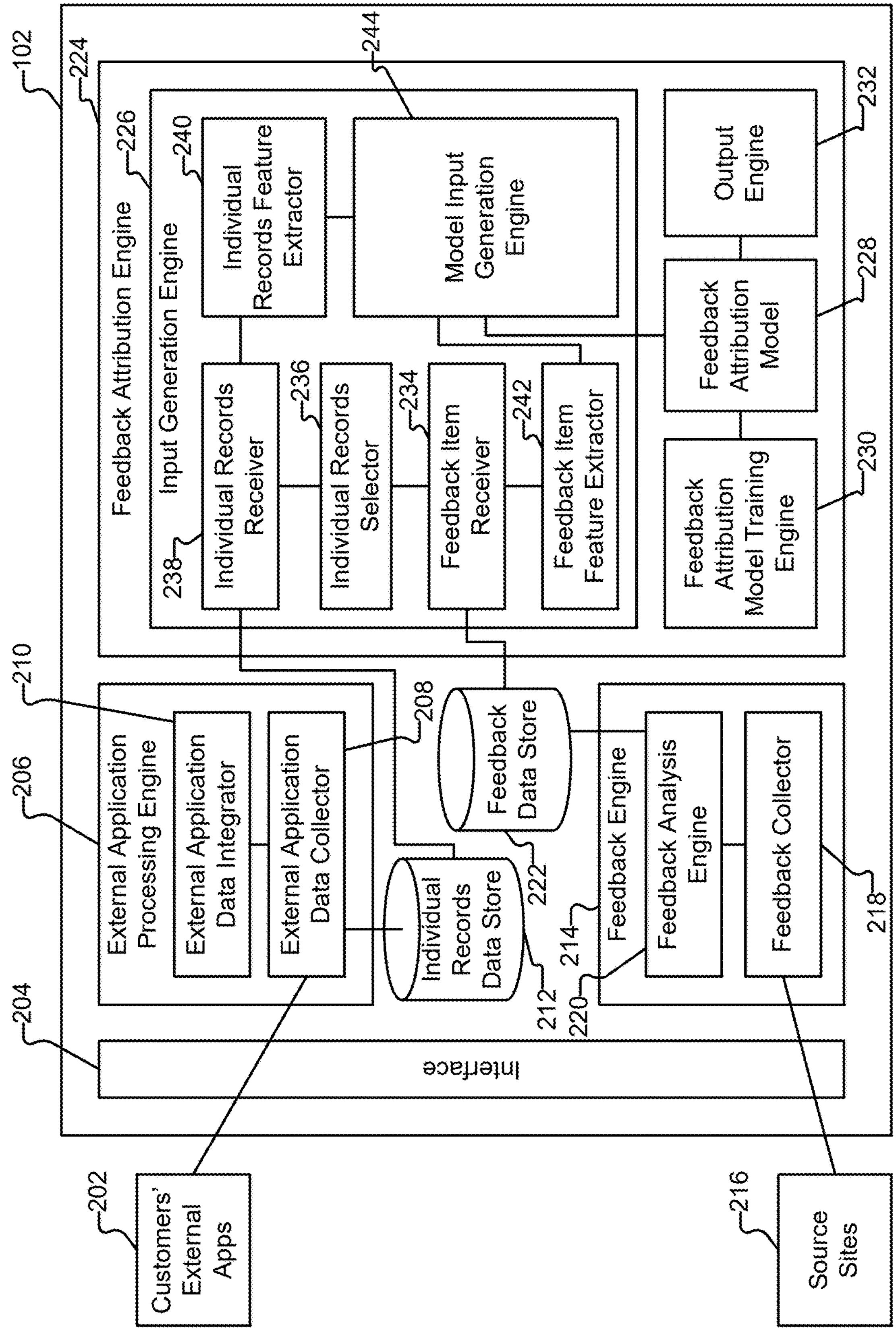
FIG. 2 illustrates an example of components included in embodiments of a reputation platform.

FIG. 2 illustrates an example of components included in embodiments of a reputation platform. In particular, FIG. 2 illustrates components of platform 102 that are used in conjunction with performing probabilistic feedback attribution. In this example, AutoBest is a "tenant" or "rooftop" that is a customer or subscriber of the services provided by reputation platform 102, which facilitates online reputation management for AutoBest and its locations. In the example shown, platform 102 includes an interface 204 for communicating with external entities over networks such as the Internet.

External Application Processing

Entities such as businesses may use applications such as customer relationship management (CRM) platforms (e.g., Salesforce, CDK, Authenticom, Yardi, etc.). In this example, AutoBest uses a CRM platform to record information about transactions or other engagement or interaction events that occurred with its customers. While examples involving CRM systems are described herein for illustrative purposes, the techniques described herein may be variously adapted to accommodate any other type of application.

Reputation platform 102 includes external application processing engine 206. External application processing engine 206 includes external application data collector 208 and external application data integrator 210.

External Application Data Collector

External application data collector 208 is configured to obtain data from external applications (202) such as CRMs. In some embodiments, connectivity between reputation platform 102 and a subscriber's (or customer of platform 102) external applications is supported using the Secure Shell (SSH) or Secure File Transfer Protocol (SFTP), application programming interfaces (APIs), etc.

In this example, AutoBest uses a CRM system to record engagements, transactions, or other types of interactions that occur between individuals and AutoBest and its dealership locations. Information pertaining to such interactions is collected by or provided to platform 102 (e.g., via the example connectivity described above). In various embodiments, a transaction event is provided or collected as raw structured data. The interaction event data may be in various formats, such as JSON, CSV, etc.

The following is one example of a data model for a transaction event recorded in a CRM for an AutoBest dealership that is collected by external application data collector 208. The example data model includes information describing a transaction event:

- Transaction
  - type-Sales/Service/Parts/Inquiry
  - Date
  - customer_id
  - Details related to transaction
    - Vehicle bought-year/make/model
    - Date
    - Related events—e.g., test drive, online inquiry, etc.
      - And their related details
    - Price
    - VIN
    - Sales agent
    - Finance liaison As shown in the example data model above, the transaction event includes a customer identifier field. In some embodiments, this is an identifier of a customer of AutoBest. In some embodiments, platform 102 includes a data warehouse that stores information pertaining to the individuals (also referred to herein as customers) that had interactions with the AutoBest locations. As one example, information associated with the transaction event obtained from the external CRM application is stored to a record of a corresponding individual in individual records data store 212 on reputation platform 102.

In some embodiments, the external data source collector 208 is configured to extract fields from an interaction event and store them to the corresponding individual's record in data store 212.

As one example, a data model for an individual's record in data store 212 includes the following:

- Customer
  - name
  - address
  - phone
  - other family members
  - vehicle
    - Purchase date
    - Service dates—vector
    - Other interaction dates and parties
    - Sold by-
    - Finance—XXX
    - Service Advisor
  - Survey history—collection of surveys
    - When requested
    - Did they open
    - Did they complete
      - All results and verbatims As shown in this example, an individual's data record includes aggregate information on everything known by platform 102 about the individual. This includes historical data about the individual, such as the example information described above obtained from a CRM. Other information extracted from transaction events is also stored (e.g., vehicle owned by user obtained from transaction information, when they had an interaction such as a car purchase or service, further details about such interactions, etc.). In some embodiments, the historical information associated with the individual may further include information such as emails, surveys sent to the individual, review requests sent to the individual, etc.

As will be described in further detail below, in some embodiments, the customer record also includes references or links to feedback items that are probabilistically attributed to the individual.

As described above, each individual made known to platform 102 (e.g., from the transaction events provided by the CRM) has a corresponding record in the individual records data store. If a new transaction event comes in for a known individual (e.g., with the same customer identifier in the transaction event), then that individual's record is updated. If a transaction event involving a new customer (with a new customer identifier that was not previously seen) is received from the external CRM application, a new record is generated in the customer data warehouse for the new customer. Example data warehouses for implementing the data warehouse 212 include MongoDB, BigQuery, Redshift, etc.

Thus, as shown in this example, each individual known to AutoBest and its locations also has a corresponding record on reputation platform 102 (and is therefore also known to platform 102), where the record for the individual includes not only information pertaining to interaction events from the CRM, but other information as well, such as historical information pertaining to feedback items associated with the individual. Thus, reputation platform 102 also has knowledge of the individuals that had interactions with AutoBest and its locations.

As will be described in further detail below, for a piece of feedback collected by platform 102, platform 102 determines, using the information about the individuals that platform 102 has learned of (e.g., from AutoBest's CRM application and/or from platform 102's own interactions with the individual), the probability that a given individual authored the review. CRM systems are but one example of a system from which information about the potential origins/sources of feedback items are obtained. The potential originators of feedback items (that leave the feedback items) may include various types of entities, such as individuals, groups of individuals, individuals operating in various capacities (e.g., as an individual or representative of a company), another business (e.g., competitor), etc., and information about such potential originators may be obtained from other systems, as appropriate.

External Application Data Integrator

In various embodiments, feedback data such as reviews, surveys, etc. collected from source sites (where feedback data collection is described in further detail below) may also be integrated or otherwise combined with other types of data to perform reputation processing. External application data integrator 210 is configured to integrate information from various external data sources (e.g., external applications 202) at platform 102. In one embodiment, the integrator is implemented as a set of rules that are based on both the data from the customer's external system and the reputation platform.

The following is one example of integration of reputation platform 102 with a CRM platform. As described above, in some embodiments, the CRM platform provides information about transactions that occur to platform 102 (e.g., via the example connectivity described above). As one example, AutoBest defines a rule that reputation platform 102 is to send out a survey for every transaction. Further, AutoBest can define rules that specify different types of requests to be sent for different types of transactions. For example, AutoBest can specify a rule where if a transaction was the sale of a specific car model or that there was a service appointment at a dealership, then a survey is sent out pertaining to that particular car model (versus another model of car).

In some embodiments, the integrator has access to a source site to facilitate leaving of feedback. For example, suppose that the integrator has API access to Google. Suppose that a user has filled in a survey provided by platform 102. In some embodiments, the survey includes a link that, when clicked on by the user, allows their feedback to be posted directly onto Google via the API on their behalf.

Feedback Data Collection and Processing

Reputation platform 102 includes feedback engine 214. Feedback engine 214 is configured to collect and process feedback from sources sites 216. Feedback Engine 214 includes feedback collector 218 and feedback analysis engine 220.

Feedback Data Collector

Feedback data collector 218 is configured to collect feedback data from various source sites 216 such as review websites, listing websites, social network sites, industry-specific sites, blogs, etc., as described above in conjunction with FIG. 1. Examples of feedback data items collected by platform 102 include reviews, surveys, listings, social comments, search results, etc. In one example implementation, the feedback data collector is implemented as a set of Java modules.

Feedback collection may be performed in a variety of ways, which may depend, for example, on the source site from which the feedback data is obtained. As one example, feedback data is collected via an API (Application Programming Interface). For example, source sites such as Facebook and Google provide an API via which updates (such as real-time updates—also referred to as "RTUs") are provided that indicate when a new piece of feedback (e.g., social comment, review, etc.) is available for an entity (or one of its locations) on the source site being monitored by platform 102.

As one example, suppose that platform 102 is monitoring the social network, Facebook, on behalf of the AutoBest dealership franchise, which has multiple dealerships across multiple cities. In this example, platform 102 registers with Facebook, instructing Facebook to send an update to platform 102 whenever a review comes up, for example, for a specific dealership in a particular city. When the update from Facebook is received by platform 102, the feedback data collector then collects the new review from Facebook via the API.

While source sites such as Facebook and Google provide functionality to provide real-time updates on new feedback, such updates are not always guaranteed to be provided, and thus, in some cases, updates may not be sent out from the source site notifying platform 102 of the new feedback update.

To counter this issue of not being provided updates when new feedback is available (and thus causing platform 102 to miss feedback), in some embodiments, the feedback collection engine is configured to poll the source site for feedback. For example, on a periodic basis (e.g., hourly, daily, etc.), the feedback collection engine is configured to query the source site (e.g., using an API) for any reviews for a location being monitored. In some embodiments, performing the polling includes using credentials for the entity to obtain the reviews. For example, platform 102 obtains AutoBest's Facebook credentials, and uses them on AutoBest's behalf to access the feedback data for the various AutoBest franchises/locations (which may have their own respective profile pages on Facebook).

In some embodiments, the feedback collection is configured to collect feedback data by performing scraping. For example, in some cases, the approaches such as those described above for collecting feedback data may not be available. For example, a source site may not have the capability to provide real-time updates. As another example, polling may not be available for a source site because, for example, the functionality is not supported, or because there are no credentials available because the location changed their social network account password, such that the platform is no longer able to collect feedback data from the source site. As another example, some source sites do not provide interfaces such as APIs by which to query for and collect feedback data. In such cases, helpers such as web scrapers may be used to scrape feedback data from a source site. The scraping may be performed on a periodic basis (e.g., every 24 hours). The web scrapers may also be used to collect feedback data from sites where platform 102 does not have the ability to obtain credentials. For example, some source sites do not provide their API for reviews.

In some embodiments, the feedback collection engine includes one or more proxies used to facilitate feedback collection. One example of a proxy is a load distribution proxy. The load distribution proxy is configured to distribute, for example, the load for scraping for feedback.

Another example of a proxy is a geographical proxy, which allows queries/scraping to be performed from what appears to be different geographical locations. For example, when collecting feedback such as business listings or search results for a specific geographic region of interest, the platform may use the geographical proxy to simulate being in a particular geographic location that is different from the actual location of the server from which the query is originating. This allows, for example, the platform to simulate a search engine query for a user residing in Boise, Idaho, even though the server making the search query is actually in Santa Clara, California (because the objective is to obtain search results relevant to Boise).

Feedback Processing

As the feedback is collected, it is further ingested, analyzed, or otherwise processed by feedback analysis engine 220.

In this example, feedback analysis engine 220 is configured to assign tags to a collected feedback item, where in one embodiment, the tags include metadata describing or indicating characteristics of the feedback item. The characteristics of the feedback item are determined based on an analysis of the feedback item. As will be described in further detail below, the determined characteristics of the feedback item are used in further downstream processing of the feedback item, such as when performing probabilistic feedback attribution.

Consider, for example, a feedback item that is a review. One example set of tags is one that includes metadata indicating overall sentiment (e.g., positive, negative, neutral, N/A) of the review, categories or topics described in the review, the local sentiment of each category or topic in the review, impact of each category or topic on reputation score (described in further detail below), etc.

In this example of a review, in order to determine such tags, analysis of the characteristics of the review is performed. For example, a rating accompanying the review (e.g., a star rating provided by the review author) is obtained. The accompanying rating is used to determine an overall sentiment for the review (e.g., whether the overall sentiment of the review is positive, negative, or neutral). As another example, the overall sentiment for the review may be determined using sentiment analysis techniques.

Text analysis is also performed on the review to determine the content of the review, such as what categories or topics are discussed in the review. The text analysis may be determined from keyword determination, an analysis of phrases in the review, etc. For each of the topics or categories identified in the review, a sentiment for a given topic or category (referred to herein as the "local sentiment" specific to the category) is also determined, for example, by performing sentiment analysis of the text.

As one example, suppose a review for one of AutoBest's dealerships is received. The review is accompanied by a four star rating (out of five stars). The four star rating is used to determine that the overall sentiment expressed by the review is positive. A text analysis is used to determine that the dealership review includes topics such as sales and service. Sentiment analysis is performed for each of the topics to determine what was the reviewer's sentiment with respect to sales, and what was the reviewer's sentiment with respect to service. For example, based on the sentiment analysis of text related to sales, it is determined that the reviewer is neutral on sales, but based on the sentiment analysis of text related to service, the reviewer was positive on service.

Various other types of tags may be applied to the feedback item based on the analysis of the feedback item. As another example, a review may be tagged as a rant if the comment length equals or exceeds a threshold (e.g., 200 characters). A feedback item may also be tagged with the source of the feedback item (e.g., what source site the feedback item was collected from). In some embodiments, a feedback item may be tagged as having characteristics that have been identified as strengths or weaknesses of an entity. For example, it may be determined that the topic or category of sales is a weakness for an auto dealership. If a review is collected that, after analysis, is determined to include the topic of sales, the review is tagged as including a category that has been identified as a weakness for the entity (e.g., tenant or location) that is the subject of the review.

Different types of feedback items may be tagged with different types of characteristics. In the above example, tagging of a review was described. For another type of feedback, such as a listing, other types of tags may be determined and applied. For example, the accuracy of a listing can be determined, where the accuracy indicates how much of the information in the listing is correct. A tag indicating an accuracy of a listing is then applied to the listing. Other tags that may be applied include tags indicating inaccurate or incorrect data (e.g., a wrong phone number), tags indicating missing information (e.g., missing hours), etc.

In some embodiments, the tagging is performed according to rules that indicate the conditions (e.g., presence of a category, certain overall sentiment, listing accuracy, etc.) on which a tag should be applied. The tagging rules may be dynamically determined based on ongoing processing performed by platform 102. For example, the categories that are strengths and weaknesses may change over time (e.g., as an entity turns its weaknesses into strengths).

In some embodiments, to facilitate the further processing of a collected feedback item, the collected feedback item is placed on a messaging bus, where the messaging bus is used to pass, publish, or otherwise send the feedback item throughout platform 102 to be acted upon by various consumers. Feedback items may be queued on the messaging bus so that they are not dropped from the platform. In one embodiment, the messaging bus is implemented with high reliability, for example, using RabbitMQ. For example, as will be described in further detail below, in some embodiments, feedback items are processed to perform probabilistic feedback attribution.

In some embodiments, the processed feedback items are stored to a database such as feedback data store (222). In various embodiments, the database is implemented using ElasticSearch, MongoDB, etc. Different types of feedback items may be stored as objects of different types. For example, a review may be stored as a corresponding review object, a survey as a survey object, a listing as a listings object, a social comment as a social comment object, etc. Each of the different objects may have certain applicable properties that are specific to the object type. For example, a review object may include an overall rating, a comment, a source, a timestamp of when it was collected, etc. A listings object, in various embodiments, may have a name, an address, a phone number, a source, etc.

The following is an example of a data model for a review stored in the feedback data store 222, where the review was left on a review site for a location (e.g., dealership) of AutoBest. In this example, the data model includes features specific to the tenant and/or industry. Other data models for different types of industries may be different.

- Reviewer
- Date
- Source
- Verbatim
- Other data either provided or pulled from review
  - Vehicle
  - People interacted with
  - Actions
    - Test drive, phone call, online inquiry, In this example, information pertaining to the review such as the reviewer (e.g., name, such as first name, last name, first initial, last initial, which may vary based on source), the source, and verbatim (e.g., verbatim text) may be specific fields and are metadata associated with the review, and are collected as structured data. In some embodiments, information that is not in a structured format (e.g., unstructured data) is extracted from the text of the feedback item, as described above, and stored as part of the record for the review. For example, a review site such as Google or Facebook that is not specific to dealerships may not have fields pertaining to the service advisor, sales advisor, make/model of a vehicle, test drives, etc. For such information, platform 102 may perform feature extraction using, for example, natural language processing, to obtain such information. The type of processing used to obtain information pertaining to a feedback item may be source dependent. For example, a source site such as Dealerrater that is tailored to the dealership industry may have more fields or structure for inputting data such as service advisor, test drive, etc., in which case platform 102 may not need to perform NLP to extract such information to be stored for the review on platform 102.

Feedback Attribution

As will be described in further detail below, probabilistic feedback attribution is performed to probabilistically map any piece of feedback to any individual. While examples of performing feedback attribution by determining probabilistic mappings between the feedback item and individuals that had interactions with a tenant are described herein for illustrative purposes, such individuals are but one example of potential sources/origins of the feedback item that are evaluated. For example, the mapping may be determined to groups of individuals, to individuals that are not customers of the tenant but are affiliated with another company and may be leaving feedback in such a capacity (e.g., as an employee of a business versus in an individual capacity), etc. The probabilistic attribution processing may also be variously adapted to accommodate other entities as the potential sources or origins of feedback (e.g., businesses that are leaving business-to-business feedback).

In the examples described herein, information about individuals that interacted with a tenant is obtained by the reputation platform from external applications such as CRM systems (e.g., by external application data collector 208, as described above). For example, via the CRM data, the reputation platform is able to determine everyone that received service at any time at any of AutoBest's locations. For example, from the CRM, the name of the individual that had a service, the service advisor, the appointment history, additional details, etc. are obtained. As will be described in further detail below, in some embodiments, for a piece of feedback being evaluated, various features or characteristics of the feedback item are extracted, such as name, time, text, location, geographic information, as well as other metadata, such as advisor, employees, department, condition, make, etc. (e.g., using feedback analysis engine 220, as described above). In some embodiments, as will be described in further detail below, the information from the CRM system regarding various individuals is evaluated against the features of the feedback item to assess the probability that each of the individuals authored the review.

As will be described in further details below, in some embodiments, machine learning models such as logistic regression are used to determine the probability that a given person left a feedback item such as a review. The use of a model to determine probabilities such as that described herein is in contrast to existing systems which perform matching using a heuristic. Here, in the examples described herein, a model is built and trained to assess the probability of how likely a given individual left a piece of feedback. Using the model described herein, platform 102 is able to determine probabilities at scale for numerous individuals that might otherwise be anonymous. Further, the probabilistic attribution model described herein may be used to assess probabilities that a heuristic may not be able to (e.g., that there is a 50% or 20% likelihood that a user wrote a review, or that out of the individuals evaluated, it is likely to be one of a smaller subset of individuals that left a piece of feedback, or that there are 5 people that might have written the review, where a first person has a 32% probability of having left the feedback, there is a 7% that another person wrote it, and that there is an 18% probability that none of the evaluated individuals wrote the review, indicating that the review may have been written by somebody that never came to a dealership). This provides increased accuracy as compared to existing systems that use heuristics. Such probabilistic attribution is especially beneficial, for example, in cases where there is not near certainty on who left a piece of feedback. Further details regarding the model and training of the model (including gathering of training data) are described below.

In the following examples, a model is used to determine a probabilistic confidence or understanding that a person left a piece of feedback. Examples of such a confidence model and training of such a model are described below.

Reputation platform 102 includes feedback attribution engine 224. Feedback attribution engine 224 is configured to determine a probabilistic mapping of a feedback item to individuals in a group of individuals. In some embodiments, determining the probabilistic mapping includes determining, for each individual, a percentage probability or likelihood that a given individual in the group authored the review, or that the feedback item is otherwise attributed to the given individual. As shown in this example, feedback attribution engine 224 includes input generation engine 226 and feedback attribution model 228. As will be described in further detail, in some embodiments, input generation engine 226 is configured to generate the input to feedback attribution model 228. As will be described in further detail below, feedback attribution model 228 is used to determine a probabilistic confidence or understanding that a person or group of people left a piece of feedback. Examples of such confidence models are described below. Feedback attribution engine 224 further includes feedback attribution model training engine 230. As will be described in further detail below, feedback attribution model training engine 230 is configured to train feedback attribution model 228. Examples of such training are described below. Feedback attribution engine 224 further includes output engine 232, which is configured to perform processing based on the output of feedback attribution model 228.

Feedback Attribution Model Input Processing

Examples and details regarding generating the input for the feedback attribution model are described below.

In this example, feedback item receiver 234 is configured to receive a feedback item on which feedback attribution processing is to be performed. This includes performing feedback attribution processing on feedback items collected, as described above, by platform 102. In some embodiments, feedback item receiver 234 receives or obtains a feedback item from a data store such as feedback data store 222. For example, feedback attribution processing may be performed as a batch process on a time-driven basis (e.g., daily, nightly, weekly, etc.). As another example, a feedback item is received or obtained in response to a trigger or condition having been met (e.g., when a new individual is identified). In other embodiments, a feedback item on which feedback attribution is to be performed is received in (near) real time, where for example, the output of feedback analysis engine 220 (e.g., an analyzed and tagged feedback item) is evaluated for feedback attribution processing as it is being ingested (where, for example, the feedback item is stored to feedback data store 222 in parallel to the feedback attribution processing).

In some embodiments, individual records selector 236 is configured to, based on characteristics of the feedback item received by feedback item receiver 234, determine a set of individuals to which the feedback item is to be probabilistically mapped.

In some embodiments, determining the set of individuals includes querying a data store such as individual records data store 212 for records and historical information pertaining to individuals that meet a set of query/filter criteria. The query/filter/selection criteria are based on characteristics of the feedback item to be evaluated.

As one example, individuals are filtered based on a location to which the feedback pertains or is directed to. For example, if a review was left on a review site page for a specific AutoBest dealership, then records in data store 212 are filtered to exclude those individuals that did not have an engagement with that AutoBest dealership location (and to select those individuals that did have an interaction with that AutoBest dealership location).

In some embodiments, individuals are filtered or selected based on a temporal characteristic. For example, individuals in individual records data store 212 are filtered based on whether they have interacted with an entity or entity location (associated with the feedback item) within a certain time period. In some embodiments, the time period of interest is determined based on a date associated with the feedback item (e.g., the date that the feedback item was posted to or published on a source site). For example, the time period may be the several months before the date of the review, the last year prior to the date of the review, etc. In some embodiments, the time period includes a period of time after or subsequent to the date of the review (e.g., 5 to 7 days after the date of the review). This is to address the problem of potential mismatches, where for some source sites, the date that the source indicates as the date on which the feedback was left is not actually the date on which the feedback was authored or left by the author.

As another example, in some embodiments, individuals are filtered/selected based on an interaction type indicated by the piece of feedback (e.g., determined through text analysis performed by feedback analysis engine 220, as described above). For example, if the piece of feedback is determined to pertain or relate to a service appointment, then individuals from the data store (e.g., from CRM side) are filtered/selected by whether they had a service appointment.

Combinations of the aforementioned criteria may be used to filter individual records to determine a relevant or otherwise applicable set of individuals on which to perform probabilistic feedback attribution for a given feedback item.

For example, individuals may be selected that had an interaction of a certain type at a specific location within a certain time period based on the characteristics of the feedback item to be evaluated. In various embodiments, selection of a set of individuals is based on other criteria. The criteria may be at varying levels of granularity. Selection of a set of individuals may be based on combinations of characteristics. For example, the attribution processing may be configured to evaluate behavior of particular users across different dealerships, or even different brands, industries, etc.

In some embodiments, individual records selector 236 is configured to generate and perform a query on individual records data store 212 for individual records based on selection/filtering criteria determined based on the characteristics of the feedback item to be evaluated.

In this example, individual records receiver 238 is configured to receive the results of the query made by individual records selector 236. In some embodiments, individual records data store 212 provides, in response to the query for individuals, a set of customer identifiers corresponding to individuals in the data warehouse that match the filtering/selection criteria. In some embodiments, the received records include historical information usable to perform feedback attribution processing. In some embodiments, for each customer, the factors that are of relevance to the feedback attribution processing are compiled for the customer identifier (e.g., that is in the example data model described above). In the example of the dealership industry, in some embodiments, for a given individual, the following is obtained from the data warehouse in various embodiments: customer name, most recent transaction, date of the transaction, as well as information relating to the transaction/interaction, such as vehicle make, model, service advisor, etc. Different historical information for an individual may be obtained for different industries.

Features of the feedback item and the selected individuals are used to determine the probabilistic feedback attribution mapping. In some embodiments, features of the feedback item to be evaluated, and features of each identified/selected individual, are extracted and evaluated to determine an input to the feedback attribution model. In some embodiments, the features that are extracted and the evaluation to be performed are based on the factors taken into account by the feedback attribution model. For example, in some embodiments, the feedback attribution model takes as input a set of attribution feature vectors, where the values for the factors/components in each of the attribution feature vectors are determined based on the characteristics/features of the feedback item, the characteristics/features of a given individual, or both. Examples of factors that are considered are described below. Other factors or components may be considered in the model. For example, different industries may have different sets of factors that are evaluated.

The following is a list of example factors/components of a feedback attribution model for the dealership industry:

First name match
First name mismatch
First name match-nickname
Last name match
Last name mismatch
Vehicle make match
Vehicle make mismatch
Vehicle model match
Vehicle model mismatch
Location name match
Location mismatch
Review within 3 days
Review within 7 days
Review within 30 days
Sales experience match
Sales experience mismatch
Service experience match
Service experience mismatch
Agent first name match
Agent first name mismatch
Agent last name match
Agent last name mismatch As shown in this example, the attribution model input feature vector encodes information about the feedback item, information about an individual, as well as what is a match/mismatch in values of an attribute from the feedback item side and an individual's historical information. For example, the features selected to be in the attribution model input feature vector include any piece of information that matches/mismatches between features of feedback items and features of individuals. The feature selection may vary for different industries, different feedback sources, different CRMs, etc.

In some embodiments, the selection of what features to include in the set of attribution feature vectors is based on what information is determinable from the individuals' data and/or the feedback item data. For example, the factors may be dependent on what is available from CRM data. The feature selection may also be based on whether the information from the CRM data is also determinable from a review (or, for example, whether what is stored for an individual by platform 102 is also determinable from a feedback item). In some cases, even if it is unlikely that a review would include a value for a feature that is available in CRM data (e.g., a VIN number, where it may be in CRM data, but less likely to be in a review), it is still selected as a feature.

As shown in this example, values for some of the factors, such as "review within 3 days" are based on features of the feedback item. However, as also shown in this example, some of the factors indicate different types of matches between features of the individual data known to platform 102 (e.g., via the CRM integration) versus the features of the feedback item. For example, first name match and first name mismatch are included, where a first name match is determined if the first name for an individual's record matches a first name associated with the feedback item (which would in turn make the first name mismatch false). Further details regarding generating the input to the feedback attribution model based on features of the feedback item and the individuals will be described below.

The model may be extended in various ways. For example, the name match versus name mismatch may be extended to encode that there is a match on a rarer name, which the model may provide a higher confidence weight. Thus, the complexity of the model may be increased.

In some embodiments, individual records feature extractor 240 is configured to extract, for each individual's record received by individual records receiver 238 (where multiple individuals may have satisfied the selection/filtering criteria), a set of corresponding features. As described above, the features extracted for each selected individual may be based on the factors/components in the feedback attribution model, including, for example, first name, last name, nickname, vehicle make (if applicable), etc. (e.g., in order to determine the values of the input feature vector). In some embodiments, a feature vector is generated for each individual identified based on the selection criteria.

In some embodiments, the feature vector is provided in response to querying of the individual records data store, where those features that are used to determine input factor values are queried for, and placed in a feature vector for each individual.

In some embodiments, on the feedback item side, feedback item feature extractor 242 is configured to extract features from the feedback item to be evaluated. In some embodiments, performing the feature extraction includes determining the values for features of the feedback item usable to determine the input to the feedback attribution model. In some embodiments, the output of the feedback item feature extractor is a feature vector. The information included in the feedback feature vector may be dependent on the source from which it is obtained, and may include factors such as first name, last name, last initial, etc. (For example, Yelp may only provide last names, while some sites provide only first names, while other sites may not use real names but instead allow nicknames). The feature vector may include the date that the feedback item was authored or left on a source site. The feature vector may also include metadata determined based on tagging of the feedback item.

Model input generation engine 244 is configured to generate the input to the feedback attribution model. In some embodiments, the input to the feedback attribution model is a matrix, table, or other data structure that includes a set of attribution feature vectors, wherein each attribution factor corresponds to a specific pair of the feedback item and a given individual in the set of selected individuals. The feedback attribution vector for a given pair is based on the features of the feedback item and/or the features of the given individual in the given pair.

Examples of factors/models in an attribution feature vector are described above. In some embodiments, the values for each factor are binary (either 0 or 1), where 1 if true, and 0 if false or unavailable (e.g., because there is insufficient information on either the CRM side and/or the feedback item side to perform matching). In other embodiments, rather than binary values, other values may be used. For example, scores may be used to determine a level of match, where the score is used as a value to a factor. In other embodiments, similarity scores with thresholds to determine how closely database individual-side and feedback-side features match are then used in the model.

In this example, the values for the input factors/components of a given attribution feature vector are based on the features extracted from the individual records and the features extracted from the feedback item. As described above, some of the factors to be used as input to the feedback attribution model are based on a comparison or evaluation of information from two different sources, where on one side there is information about an individual known by platform 102 (e.g., collected from an external application such as a CRM system), and on the other side, information about a feedback item collected from a source site. In some embodiments, the values for such factors are determined by model input generation engine 244, which in some embodiments is configured to perform, for each individual in the set of individuals to be evaluated, a comparison of the values for the same corresponding factor from an individual's recorded historical information and from the feedback item.

As numerous individuals with records on platform 102 may match the selection criteria based on the characteristics of the feedback item, in some embodiments, as described above, model input generation engine 244 creates a data structure such as a matrix or a table of input feature vectors. For example, in one embodiment, an input attribution feature vector is generated for each pairing of the feedback item and a given individual (in the set of selected individuals).

For example, suppose that 1000 individuals' records were identified that fit the filtering/selection criteria. The above described matching is performed to determine an attribution feature vector of 0's and 1's of what information matches on each side (individual record side information and feedback item side information) for each of the 1000 individuals. In some embodiments, this results in the generation of a table with 1000 rows, where each row is an attribution feature vector generated for the specific combination of the feedback item and a given individual. As will be described in further detail below, a machine learning model, such as a regression model, is applied on each of those pairs (of feedback item and a particular individual) to determine, for each individual, the likelihood that the individual wrote or authored that review.

The input attribution vectors generated for each pair of feedback item/individual are provided as input to a machine learning model. As described above, in various embodiments, the input is a matrix or a table, where each row of the matrix/table corresponds to a pair of the feedback item and a given individual, and includes the attribution input feature vector determined for that pair.

Probabilistic Mapping using a Feedback Attribution Model

In this example, the output of input generation engine 226 is provided as input to feedback attribution model 228. As one example, the table or matrix of attribution feature vectors is provided as input to a multinomial logistic regression model, which applies a weight to each factor. As output, the machine learning model provides a probability distribution vector that includes, for each individual, a probability or likelihood or percentage confidence that the individual left the feedback item (or that the feedback item is otherwise attributed to that individual). Thus, for example, if 1000 individuals were evaluated, then an output probability vector including 1000 probabilities is generated. In some embodiments, each probability is associated with an identifier of the feedback item and an identifier of a corresponding individual (e.g., to uniquely identify the pair or combination of feedback item and individual that a given probability was determined). While an example involving a multinomial logistic regression model is described herein for illustrative purposes, the feedback attribution techniques described herein may be variously adapted to accommodate any other type of machine learning model as appropriate. Other examples of models that may be used, without limitation, include other models that incorporate regression, decision trees, neural networks, Bayesian inference, or other approaches. Ensemble or hierarchical models combining multiple approaches may also be used in various embodiments.

In some embodiments, the feedback attribution analysis is implemented using Python, R, or other data analysis tools. In some embodiments, the analysis is performed, and the output generated, via a custom-built processing and user interface (UI) engine. In some embodiments, the output of the feedback attribution processing (e.g., probability vector) is stored. For example, the output may be stored in a relational data structure such as MySQL, Redshift, BigQuery, or an alternative structure such as MongoDB or a custom data store.

Output Processing based on Probabilistic Feedback Attribution

By using the probabilistic feedback attribution techniques described herein, a tenant such as AutoBest is able to probabilistically determine who, in the various people that AutoBest has interacted with, left a piece of feedback, and once the probabilities are known for certain individuals, AutoBest or the reputation platform can then use that probabilistic information to further bring in more information and gain further insights. Examples of processing that may be performed based on the output of feedback attribution model 228 are described below. In some embodiments, output engine 232 is configured to process the probability vector outputted by feedback attribution model 228.

In some embodiments, user interfaces are provided to users of the platform. For example, UIs for aggregating reviews that have been attributed to certain entities such as individuals, service advisors, sales people, etc. are generated. In some embodiments, a leaderboard is created.

In various embodiments, as will be described in further detail below, various actions are performed based on the output of the probabilistic feedback attribution machine learning model (e.g., by using the output probability vector that includes probabilities for each feedback item/individual pairing).

In some embodiments, information based on the probabilistic feedback attribution is stored for the feedback item. As one example, the output probability vector is stored as information for the feedback item that was evaluated. For example, an array of individuals (identified by their customer_IDs) and their corresponding probabilities are stored to the record for the feedback item (e.g., to the entry for the feedback item in feedback data store 222). In some embodiments, only those individuals with a non-zero probability (or some probability above some threshold, which in some embodiments is set to be close to zero) are included in the array.

Another example of information that may be stored for the feedback item includes links/references to the individuals in the array. As another example, the probability that none of the evaluated customers authored or left a feedback item is stored for the feedback item (i.e., the probability that none of the individuals known to platform 102 left the feedback item). In some embodiments, the probability that none of the evaluated individuals left the feedback item is computed as 1 minus the sum of the probabilities determined for the evaluated individuals.

In some embodiments, an indication is stored that probabilistic attribution has been performed for the feedback item. For example, a Boolean value indicating whether attribution has been performed is associated with the feedback item.

In some embodiments, the record for the feedback item includes information usable to determine whether probabilistic attribution should be performed again for the review. For example, rules or logic are implemented that trigger re-evaluation of feedback items. This includes, for example, rules for triggering re-evaluation of a group of feedback items, such as those pertaining to a location, where those feedback items may include feedback items that have not yet undergone probabilistic feedback attribution (which may be determined on the Boolean value described above), or have previously gone through feedback attribution processing, but were not attributed to any individual known to platform 102. As one example, the re-evaluation of a group of feedback items is triggered in response to an individual being identified (e.g., from interaction events received from the external CRM application). In other embodiments, collection of a new feedback item triggers a re-evaluation of all feedback items where the platform was not confident of the author (where the confidence may be a threshold value or some other statistical measure).

In some embodiments, if an individual is determined with a high confidence (e.g., above a threshold such as a threshold percentage or above a threshold number of standard deviations), then the feedback item is attributed to the individual, and the feedback item is included or otherwise referenced or linked to the individual's record of historical information. In some embodiments, the username or handle associated with the feedback item is also associated with the individual. In this way, in some embodiments, platform 102 also determines alternative channels by which to target an individual. For example, platform 102 links the individual with a username on the source site (e.g., by obtaining the username from the source site when collecting the feedback). In some embodiments, if it is determined by the probabilistic feedback attribution engine that an individual has left certain pieces of feedback on different source sites, then platform 102 determines, probabilistically, the source sites on which the individual has an account/profile. In some embodiments, platform 102 joins the profiles of the individual on the various source sites based on the feedback attribution processing. In some embodiments, based on the knowledge of which profiles on what source sites belong to the individual, platform 102 collects historical feedback items pertaining to those profiles that were probabilistically determined to be associated with the individual (who was identified, for example, from another application such as CRM data, as described herein).

In some embodiments, a client record in the CRM (or in the client record on the platform generated using information from the CRM) is enhanced when a match is found. In some embodiments, specific follow-up actions are triggered, such as contacting a customer or remedying an open issue.

In some embodiments, normalization is performed. For example, the sum of the individual probabilities is determined. If the sum of the probabilities across the individuals is greater than 1, then normalization is performed (so that, for example, after the normalization, the total probability sums to 1). In some embodiments, normalization is not performed if the sum probability does not exceed 1, as there is a possibility that it was none of the evaluated individuals that wrote the review.

In some embodiments, feedback attribution engine 224 determines the probability that the feedback item is attributed to none of the evaluated individuals. In some embodiments, this is done by summing up all individual probabilities (that the individual left the review), and subtracting that summed value from 1. Based on the probability that none of the evaluated individuals wrote the review, various processing may be performed. For example, if there is a high probability (e.g., above a threshold) that none of the CRM-side individuals left the piece of feedback, this may lead to further processing to determine whether the review is a fake review, whether the review was left by someone at a different dealership (and the author left a review for the wrong dealership), etc.

As another example, if it is determined with a certain confidence that none of the individuals wrote the review, then this may be an indication that whoever wrote the review is not being totally honest about the information that they are putting in the review. Based on this determination, AutoBest may be prompted to perform actions such as petitioning the host (e.g., source site that is hosting the review) to have the review removed, to contact the reviewer and inform them of their error, or to take some other action.

There are various reasons why nobody is able to be attributed to a piece of feedback. For example, it may be the case that the entity AutoBest is not providing all of their customer data. As another example, reviewers may write reviews about locations or businesses that they did not have an interaction with (where the reviewer is not actually a customer known to the entity's CRM system). As another example, the reviewer may be a customer in the CRM, but the person's name is not available. For example, rather than requiring a real name, some review sites may allow people to use fake names, such as "howdycowboy999," which would reduce the match/attribution rate of the machine learning model, whereas the attribution would be much higher for the same review on another site that requires a real name. In such a case, the platform may provide to AutoBest recommendations or suggestions of actions to take. Such suggested actions may include responding directly to the review to ask for more information that may help to clarify who is leaving a review (e.g., asking for a date of service or the Service Advisor that the reviewer worked with), or to solicit (either online or offline) customer specific information such as a name or phone number.

As another example, based on the probability that none of the evaluated individuals wrote the review, it is determined whether to re-perform the attribution processing, where the attribution processing may be performed with different criteria. For example, if the probability that none of the evaluated individuals wrote the review exceeds a threshold (or the sum of the individual probabilities is less than a threshold), then the attribution processing is re-performed with different filtering criteria, such as expanding the filtering time period (which may increase the pool of matching transactions/individuals).

As described herein, the probabilistic feedback attribution processing provides a distribution of probabilities across a number of individuals. Various processing may be performed based on how the probabilities are distributed across the individuals, even if the probabilities do not, with high likelihood or confidence, attribute a piece of feedback to a single individual.

Suppose, as one example, that it is determined, based on assessment by the model, that the probabilities for two individuals was 1, or very close to 1, with the attribution probability being close to 0 for all other individuals. That is, in this example, the model has determined that it is equally likely that two individuals left the feedback item. In some embodiments, this is an indication that the two individuals are actually the same person (where two different records had been created for the same individual in the customer data warehouse). In some embodiments, in response to such an indication, cleanup of the customer records is performed based on the output of the attribution modeling, for example, by merging the two records together.

As another example, suppose that a site only provides last initial (e.g., to protect user privacy), and a review being evaluated has the name "John S." with no comment about a certain dealership. Suppose that there are three John's from the CRM side that are John S. Based on the attribution modeling, it is determined that one John S. has a likelihood of 30% of having written the review, another John S. has a likelihood of 20% of having written the review, and another John S. is attributed a 10% probability of having written a review, leaving a 40% probability that none of them left the review. In this example, where there is not a clear indication of who wrote the review, such information is stored. For example, each John S. is kept track of, and their determined probability of having authored the review is recorded. In some embodiments, the determined probabilities are paired with information about the review (e.g., via a link). For example, suppose that the review that was evaluated was a negative review. For the John S. that it was determined had a 30% chance of writing the review, platform 102 sends to AutoBest, for example, information indicating that there is a 30% chance that this John S. (who may have a unique identifier) wrote a negative review. AutoBest may use that combined probability/feedback information associated with the evaluated individual to take further action.

In the above example involving John S., additional information is used to determine whether one of the individuals is more likely to have written the review. For example, further historical information may be used to further modify the attribution probabilities. As one example, for each individual, it is determined, from their historical information, whether they have previously left feedback that has a same sentiment as the piece of feedback on which attribution modeling had been performed. For example, suppose that there are two John S.'s that are equally likely to have written a particular review on which feedback attribution was performed, where the particular review has a negative sentiment. If one of the John S.'s has previously left negative feedback in the near past (e.g., within a time period), then the percentage likelihood that individual left the review is increased to indicate that it is more likely that they left the review.

In some embodiments, the determined attribution probabilities are used to address the issue of fake reviews. For example, if a certain dealership or location has a disproportionately high number of reviews that are not attributable to any individual known to platform 102, then a warning flag is sent to the location/tenant indicating the potential presence of fake reviews (e.g., because someone is writing their own fake reviews, a competitor is writing fake reviews, etc.).

In some embodiments, the probability that the review was not authored by any of the entities that were considered/evaluated is compared against a threshold. If the probability that the review was not authored by any of the considered entities is above the threshold, then the review is flagged. In some embodiments, the review is also flagged if the review matches a particular entity, but the contents or facts associated with the review do not match the records available to the platform (e.g., the review claims issues relating to a service that is not in the platform's records from the CRM system). Such scenarios are potentially indicative that the reviewer is being untruthful, or may indicate missing or false data in the client records stored on the platform (e.g., in individual records data store 212). In some embodiments, the system sends an alert to AutoBest indicating that there is a potential fake review. In some embodiments, the alert includes a link to the potential fake review so that the AutoBest operator may see the review.

As yet another example, the attribution analysis can also be used to determine whether an observed volume of reviews is not due to customers of the location/tenant, but due to other individuals that did not actually have any interaction with the location/tenant. For example, in some cases, such as on social networks, one user may post a negative review, and then friends of that individual copy the review, thereby causing negative reviews to propagate, even though the individuals did not actually interact with the entity (rather they have written a negative review about a location because their friend was upset about it). In this example, based on the attribution analysis, it can be determined the probability of who wrote the review, and if there was an individual that actually had an interaction with the location/tenant that has a high probability of having written the review, then it can be determined that other reviews that have copies of the text or similar text (e.g., based on a similarity detection) are copies of that attributed review. This can then be flagged to the location/tenant.

In some embodiments, to further enhance or improve the efficacy of determining fake reviews, training data is gathered on fake reviews versus real reviews. Measures that indicate fakeness (e.g., excessive use of capitalizations, excessive use of certain words, phrase, or topics, etc.) are incorporated into the machine learning model used to perform feedback attribution. Further details regarding training of a feedback attribution model are described below.

As described above, one example of actions that may be taken based on an analysis of the output of the attribution processing is to send alerts to users. For example, as described above, users may be notified of suspect reviews, and also provided a link to view such reviews.

Figure 3:
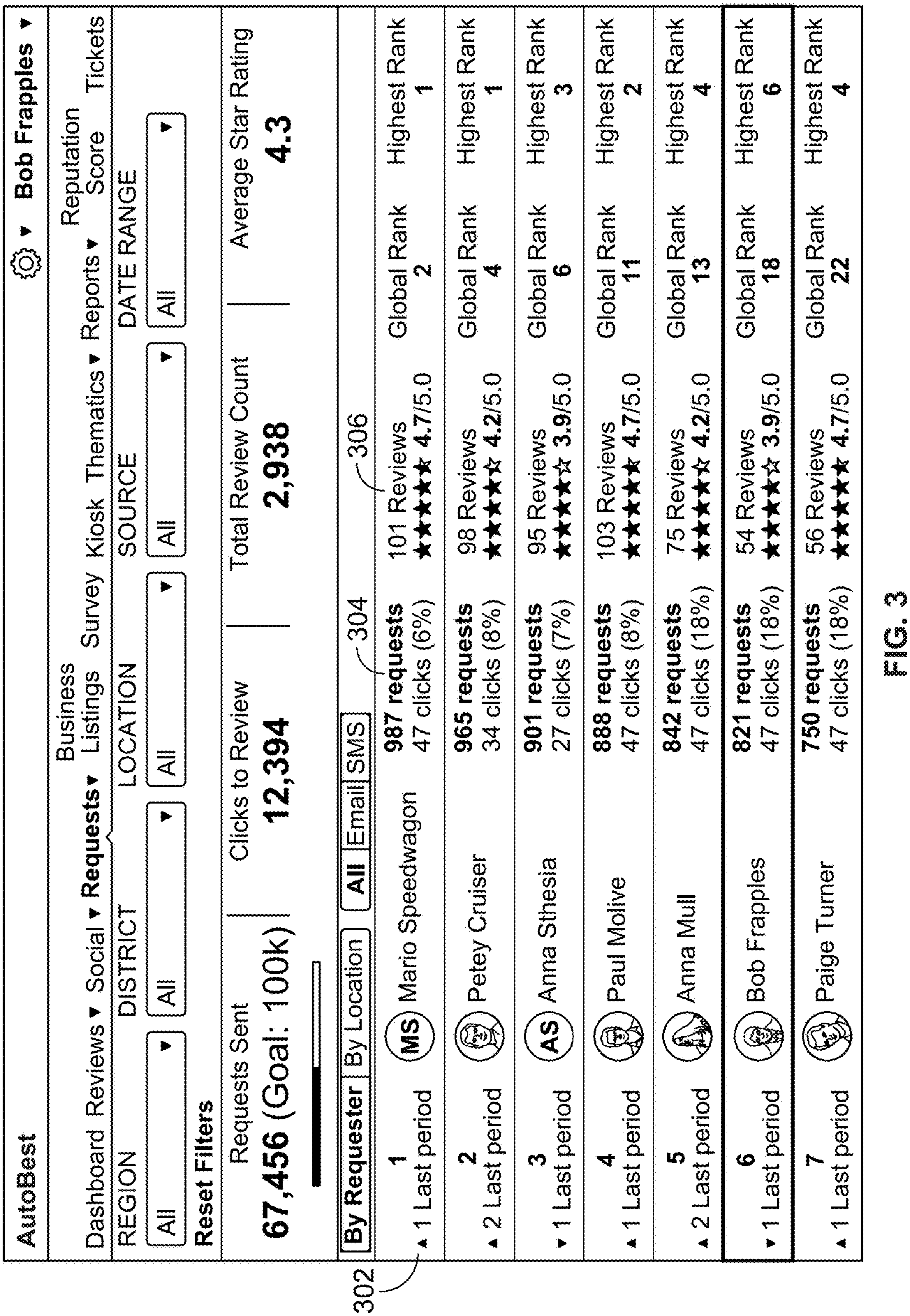
FIG. 3 illustrates an embodiment of a user interface.

Another example of actions that may be taken is to generate a leaderboard. FIG. 3 illustrates an embodiment of a user interface. In this example, a leaderboard showing a ranking of customer satisfaction of AutoBest associates is shown. In this example, reviews are tied to associates who have served customers and satisfaction of those customers is tracked.

In this example, the values are determined as follows. With respect to Mario Speedwagon (302), 987 requests were sent out (304). In this example, the value 987 is determined as the count from the CRM system side of how many customers Mario serviced in the last year (or any other time period as appropriate). In this example, each of those 987 customers that had been serviced was sent a review request.

The value of 101 reviews (306) is the number of reviews that were determined to be attributed (e.g., by using the feedback attribution processing described herein) to customers that had been serviced by Mario Speedwagon in the last year. As one example, a set of individuals to be evaluated is determined by identifying, from the records in individual records data store 212, who had a service appointment with Mario in the last year. Separately, a set of feedback items is received. For a feedback item in the set, such as a review, feedback attribution is performed to probabilistically map the review to the set of identified individuals. This is performed, for example, to determine what reviews (in the feedback items that were collected by the platform) were left by customers who had their vehicle serviced by Mario Speedwagon in the last year. Analysis of those reviews determined to have been left by customers of Mario Speedwagon can then be performed to determine, for example, the satisfaction those customers had with their service with Mario Speedwagon. If, for a given review, the likelihood that a given individual left that review exceeds a threshold, then the review is attributed to that given individual. If the likelihood that none of the individuals left the review is above a threshold, then it is determined that none of the individuals left the review, and the review is not attributed to any of those individuals. Those reviews that were attributed to (i.e., probabilistically determined to be left by) an individual that had been serviced by Mario Speedwagon are then aggregated together. Those reviews may then be evaluated to determine a satisfaction of those customers. For example, the satisfaction (4.7/5.0 in this example) is determined by averaging the overall rating for each of the 101 reviews determined to have been attributed to customers that had their cars serviced by Mario Speedwagon in the last year. Mario Speedwagon is then ranked based on the sentiment of the reviews attributed to customers whose vehicles had been serviced by Mario Speedwagon. The ranking may also be based on other factors such as total number of requests, number of attributed reviews, etc.

Training a Model for Probabilistic Feedback Attribution

The following is an embodiment of training a machine learning model for probabilistic feedback attribution. In this example, training of the above multinomial logistic regression model is described for illustrative purposes. The techniques described herein may be variously adapted to accommodate training of other types of machine learning models for probabilistic feedback attribution.

The following is an embodiment of selecting training data for training of a machine learning model for performing probabilistic feedback attribution. In one example, feedback items for which the authorship is known are selected automatically. An example of such a review is one that reputation platform 102 posted on behalf of an individual. For example, as described above, via external application data integrator 210, platform 102 sends out surveys or review requests to individuals in response to transactions or interactions that occurred between an individual and a tenant (and were recorded, for example, in a CRM). In some embodiments, platform 102 posts a review on the individual's behalf, or the CRM individual posts a feedback item such as a review to a review site provided by platform 102 (e.g., using integrator 210 described above). As one example, the user clicks on a link in a survey or request for feedback that causes their feedback to be posted directly to a source site via API access that platform 102 has to the source site. That is, platform 102 knows who left the piece of feedback because the piece of feedback was generated using platform 102, and platform 102 was directly responsible for that piece of feedback. In such cases, the platform has complete certainty over the author of the feedback item, where, for example, the platform knows that a piece of feedback was generated in response to a review request, and that the piece of feedback is definitely attributed to a specific individual. In these cases, platform 102 knows the identity of who left a piece of feedback. For example, as described, in some embodiments, platform 102 sends out review requests and posts reviews on behalf of the people (who are identified via CRM data) to whom the review requests were sent.

In other embodiments, feedback items are manually validated or matched to CRM individuals. As another example of determining training data, in some cases, when individuals leave feedback, they are responded to (e.g., by someone working at a location or tenant), and through the course of the communication, additional information is obtained (e.g., further details about an interaction), allowing the identification or validation of the individual that left the review. For example, when such reviews are updated, the sequence of feedback update events is matched to a sequence of interactions between an entity and the individual. Such reviews may also be used as training data.

The following is an example of training the feedback attribution model. Suppose that 100 reviews are identified (e.g., using the training data selection techniques described above) where the individual that left the piece of feedback is known. Suppose that the information (e.g., transaction information) associated with 1000 CRM individuals is obtained.

Using the above example machine learning model factors, an input training data structure is generated. For example, each of the factors is taken as a binary value (0/1). If for instance there is no first name, then the factor of "first name match," "first name mismatch," and "first name match-nickname" are all given a value of 0. These are, for example, the input variables.

With 100 reviews by 1000 customers, this results in a row of data for each review and customer pair (resulting in 100,000 rows of data). Other data structures may be used. In this example, each review/customer pair is also labeled. For a given review in the training data, the author or individual who left the piece of feedback is known, and the corresponding review/customer pair is labeled as being a match. For the remaining 999 customer/review pairs for that given pair, those pairs are labeled as not being matches. That is, the output variable is whether or not a given piece of feedback relates to a given customer, which may be manually and/or automatically tagged for each review.

The following is an example row of the input training data structure:

[customer_id, feedback_id, [attribution feature vector], attributed (0/1)]

where in some embodiments, the identifier of the customer and the identifier of the feedback item ("customer_id" and "feedback_id", respectively, in the above example data structure) are maintained for reference, and the actual input data to be used in the training model is in the attribution feature vector.

As shown in this example, for a given individual (identified by their customer identifier), an attribution feature vector is generated for the pair of the individual and the piece of feedback item. In this case, it is known whether or not that individual left the piece of feedback, and the attribution is labeled accordingly.

In this example, training is performed by fitting a logistic regression to the training data, which provides weights for each factor of the machine learning model.

In some embodiments, there are different machine learning models per industry (e.g., because the auto industry has certain attributes, such as parts advisors, that the healthcare industry does not). In some embodiments, models may be individually tuned for specific sources or sets of sources. In some embodiments, different machine learning models are used, with different tuning. For example, different models may be used that are tuned uniquely to certain review sites. In other embodiments, the same model is used with the same industry. The model may include or be extended to include attributes that are different on different source sites. For example, if a source site only provides a first name and a last initial, then in some embodiments, the model is included with factor(s) that take into account the last initial (e.g., by adding variables of "last initial match" and "last initial mismatch").

While the model may be trained for different source sites, with different parameters and attributes, there may be a tradeoff, as tuning for a particular source site limits the volume of relevant training data (as it may be limited to feedback from that source site for which the model is being uniquely tuned). In some embodiments, rather than having different tuned models for different source sites, a same model is used that incorporates attributes of various source sites, allowing for a larger volume of training data to be used. In some embodiments, ensembles of models are used.

Illustrative Examples of Probabilistic Feedback Attribution

The following are illustrative examples of AutoBest utilizing the probabilistic feedback attribution processing provided by reputation platform 102.

FIRST EXAMPLE

In this example, suppose that a review was left online on a review site on Feb. 11, 2020 by Bob Smith relating to AutoBest West-"Love AutoBest West, love my new Courser. Joe was super helpful."

In this example, reputation platform 102 collects the review from the source site (e.g., using feedback collector 218). The platform performs feedback attribution on the review (e.g., using feedback attribution engine 224) by extracting various features of the review, such as:

- Reviewer
- Date
- Source
- Verbatim
- Other data either provided or pulled from review
  - Vehicle
  - People interacted with
  - Actions
    - Test drive, phone call, online inquiry, . . .

In this example, based on the features of the review, a set of individuals to which the review is to be probabilistically mapped is determined. For example, the set of individuals to be evaluated includes those that had an interaction with AutoBest West (as specified in the review, or because the review was left on the page of a location corresponding to AutoBest) within a time frame/period around the time that the review was left (e.g., a time period that includes a period before and a period subsequent to the date that the review was left).

In this example, suppose that the attribution processing filters or limits the set of individuals to anyone who has had an engagement with the AutoBest West location in the last year.

In this example, suppose that multiple individuals (who, for example, have records in individual records data store 212) are determined to match the filtering criteria based on the characteristics of the review. In this example, suppose that one of the individuals in data store 212 is Robert Smith, who according to their record on reputation platform 102 (which includes, for example, information collected from AutoBest's CRM), has purchased a 2020 Courser on Feb. 6, 2020 from Sales agent Joseph James at AutoBest West. An example of Robert Smith's record is shown below.

- Customer
  - Customer id: 1234
  - name—Robert Smith
  - vehicle—2020 Courser
    - Purchase date—Feb. 6, 2020
    - Service dates—vector
    - Other interaction dates and parties
    - Sold by—Joseph James
    - Finance—XXX
    - Service Advisor
  - Survey history-collection of surveys
    - When requested
    - Did he open
    - Did he complete
      - All results and verbatims
- Transaction
  - Sales/Service/Parts/Inquiry
  - Date
  - Served by
  - Details related to transaction
    - Vehicle bought-year/make/model
    - Date
    - Related events—e.g., test drive, online inquiry, etc.
      - And their related details
    - Price
    - VIN
    - Sales agent
    - Finance liaison In this example, a feature vector for the feedback item is generated. The information included in the feedback feature vector includes various characteristics of the review. On the other side, feature vectors for each of the individuals are also generated. In some embodiments, a data store of individual records (e.g., data store 212) returns, for each individual that satisfies the filtering/selection criteria, a vector of information associated with the user. In the case of Robert Smith, his individual feature vector includes, for example, his most recent sales experience prior to the date of the specific review, the service advisor's name, his vehicle make, his vehicle model, etc.

The feedback item feature vector and the individuals' respective feature vectors are combined to generate an input to a feedback attribution model, where the input includes a data structure such as a matrix or table that includes multiple attribution feature vectors, where each attribution vector corresponds to a particular pairing of the feedback item and a specific individual. For example, one of the attribution feature vectors corresponds to the pair of the review and Robert Smith customer (whose record has a specific, unique customer identifier in the data warehouse 212).

As described above, in some embodiments, generating the attribution model input feature vector for a pair of the review and an individual includes determining whether there is a match/mismatch on certain attributes (e.g., first name, nickname, vehicle, etc.) between the feedback item and the individual.

The following is an example of an input attribution feature vector based on the specific pairing of the review and Robert Smith. As shown in this example, the matching of characteristics is encoded such that binary values (e.g., 0 or 1 in this example) are provided for each factor. While binary values are shown in the examples described herein for illustrative purposes, as described above other types of values may be used for this and other type of models used to perform feedback attribution.

First name match—0
First name mismatch—0
First name match-nickname—1
Last name match—1
Last name mismatch—0
Vehicle make match—1
Vehicle make mismatch—0
Vehicle model match—1
Vehicle model mismatch—0
Location name match—1
Location name mismatch—0
Review within 3 days—0
Review within 7 days—1
Review within 30 days—0
Sales experience match—1
Sales experience mismatch—0
Service experience match—0
Service experience mismatch—0
Agent first name match—1
Agent first name mismatch—0
Agent last name match—0
Agent last name mismatch—0

As shown in this example, the attribution feature vector for the pair of the review and Robert Smith includes factors that include the possible outcomes of matching on certain attributes such that the matching can be encoded in a binary format. For example, with respect to the "first name" attribute, possible outcomes of matching the name from the review and the name obtained from the CRM system have been broken out as individual factors or components in the input attribution feature vector that may be encoded as 0 or 1 (or True/False). In this example, with respect to the "first name" attribute, the name "Bob" from the review and the name "Robert" from the CRM are not a match, and thus the value for whether there is a first name match is 0. However, Bob is a nickname or shortened version of Robert, and thus the factor corresponding to "first name match-nickname" is true, and set to 1. The factor corresponding to a mismatch between the feedback attribute value and the CRM attribute value is set to 0, because there was not a mismatch (since the first name attribute values did match from a nickname perspective).

In this example, where this is not sufficient information to make a determination of match/mismatch, the values for both the match and mismatch factors are set to 0 (see, for example, the agent last name match/mismatch factor, where there was not sufficient information to determine the agent's last name from the review since that information was not present in the review). As another example, if the review mentioned that a car of a first make was purchased, but the CRM transaction data indicates a different make, then the factor corresponding to a match on the attribute "vehicle make" may be set to 0, while the factor corresponding to a mismatch on the attribute "vehicle make" may be set to 1. If there is no mention of the make, or there is insufficient information to perform matching, then both match/mismatch factors are set to 0. In some embodiments, the baseline for the attribution model is that all factor values are 0. In this way, in some embodiments, in a model such as a regression model, any of the match variables will have a positive coefficient that increases the probability of attribution, while mismatch variables will have a negative impact on the probability (where the impact need not be symmetric between match/mismatch). This provides the model flexibility to understand what it is learning, and how to extend the model.

In this example, the table of attribution feature vectors is provided as input to a probabilistic feedback attribution model (e.g., model 228). In this example, suppose that the algorithm assigns a very high confidence (e.g., 99%) that the Robert Smith above, that is known to platform 102 from the CRM data, has left the review, with a near zero probability for all other evaluated individuals.

In this example, being able to tie the review (which came from a source or via a path different from the interaction data from the entity) to individuals provides various benefits. For example, by knowing that the author of the review left on a review site is the Robert Smith that AutoBest has previously interacted with and has a record of in their CRM, the AutoBest West dealership location may then bring in further information to improve the customer experience. For example, AutoBest West can access their records for Robert Smith to further review historical information such as the history of service advisors, which would then allow AutoBest, for example, to aggregate additional information to determine how satisfied their customers are with certain service advisors or sales agents. This is in contrast to the case where an individual explicitly mentioned a sales agent or where an individual responded to a certain sort of review about a sales agent.

SECOND EXAMPLE

In this example, suppose that a review was left on an online review site on Feb. 21, 2020 by Maggie Smith on a page relating again to AutoBest West-"Love AutoBest West. Joe was super helpful."

In this example, suppose that based on the filtering criteria of location (AutoBest West) and time (within 30 days before to 10 days after), Robert Smith is again identified in a group of individuals from data store 212 of reputation platform 102.

In this example, the attribution feature vector generated for the pair of the review and Robert Smith's record is as follows:

First name match—0
First name mismatch—1
First name match-nickname—0
Last name match—1
Last name mismatch—0
Vehicle make match—0
Vehicle make mismatch—0
Vehicle model match—0
Vehicle model mismatch—0
Location name match—0
Location name mismatch—0
Review within 3 days—0
Review within 7 days—0
Review within 30 days—1
Sales experience match—0
Sales experience mismatch—0
Service experience match—0
Service experience mismatch—0
Agent first name match—1
Agent first name mismatch—0
Agent last name match—0
Agent last name mismatch—0

As shown in the above example attribution feature vector, the components of first name mismatch, last name match, review within 30 days, and agent first name match are set to 1, while all other values are set to 0.

In this example, there is some conflicting information related to this match between the review and Robert Smith's record, where some factors match, but other factors such as first name do not. Suppose that for the AutoBest West location, there is another individual identified in data store 212 that has the last name Smith (Linda Smith in this example), who most recently visited the store on Aug. 11, 2019, but has never engaged directly with any employee named Joe (to the knowledge of platform 102 in this example, where there is no such transaction event recorded in Linda Smith's record).

In this example, suppose that the feedback attribution machine learning model assigns a 50% probability that this review relates or can be attributed to Robert Smith, a 20% probability that it relates to Linda Smith, and a 10% probability distributed across all other evaluated individuals. This leaves a 20% probability that the review was related to no known individual (that is known to the platform or AutoBest's CRM).

In contrast to the first example above, where there was a high confidence of a match to a person known to platform 102, in this second example, there is a distribution of probabilities assigned across a number of individuals, where it is not decided whether or not there is a definitive match to one person or another. As described above, various processing may be performed based on the percentage likelihoods determined based on the feedback attribution processing described herein. For example, AutoBest is notified of the different individuals and their probability of having left the review. AutoBest may then perform further processing based on this probabilistic knowledge.

THIRD EXAMPLE

As described above, in some embodiments, probabilistic feedback attribution is re-performed. In this example, individuals' historical data is leveraged, even across multiple locations.

In this example, suppose that Jerry Davis leaves a review for AutoBest West on Mar. 1, 2020-"Went to AutoBest West looking to buy a Courser. Salespeople are so RUDE. Will never go back."

In this example, suppose that in a first pass of probabilistic attribution, the Jerry Davis of the review did not match anyone in platform 102's individuals' records data warehouse, and there is a low match probability to any known AutoBest customer.

Now suppose that at a later date, platform 102 collects a transaction event from the AutoBest's external CRM application, where on Mar. 15, 2020 a Jerry Davis buys a Courser at a different AutoBest dealership-AutoBest South. Here, suppose that this is a new individual from the perspective of platform 102 (in that platform 102 did not previously have a record for a Jerry Davis since it had not seen a transaction event for this individual from the CRM system), and a new record is generated for Jerry Davis in the individual records data store 212 on reputation platform 102.

In this example, in response to identification of a new individual in the data warehouse related to a tenant (AutoBest in this example), probabilistic feedback attribution is performed or re-performed on various feedback items, such as those that were not attributed to anyone (which may be indicated via a flag in the record of the feedback item on platform 102), including the review in this example.

In this example, the review is evaluated again, with the new Jerry Davis record being identified as being a candidate (where, for example, the selection criteria for individuals is broadened to include individuals with transactions at other AutoBest locations—that is, in this example, the selection criteria for this second pass of feedback attribution processing performed on the review is different from the first time the feedback attribution processing was performed on the same review). In this example, by re-performing feedback attribution processing, feedback attribution engine 224 determines, with a high probability, that the Jerry Davis in platform 102's records is likely the person who left the review.

In the above example, re-processing of the review was based on identification of a new individual across all AutoBest locations, which triggered re-evaluation of some or all reviews. In some embodiments, all (or a subset of) feedback is reviewed on a periodic basis (e.g., every day, week, month, etc.).

Thus, as shown in the examples above, by using the feedback attribution techniques described herein, AutoBest is able to determine, probabilistically, who, in the various people that AutoBest has interacted with, left a piece of feedback.

Figure 4:
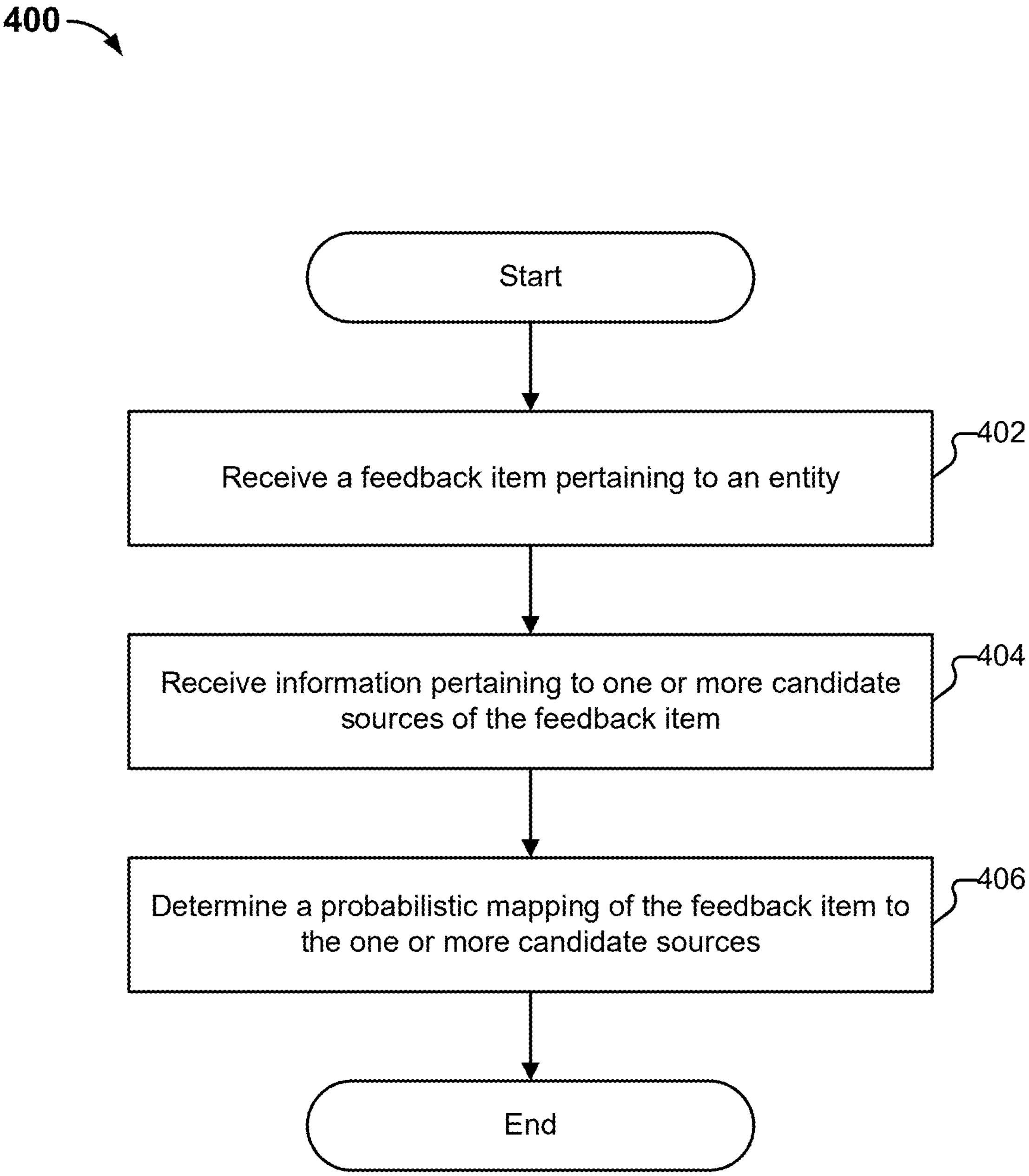
FIG. 4 is a flow diagram illustrating an embodiment of a process for feedback attribution.

FIG. 4 is a flow diagram illustrating an embodiment of a process for feedback attribution. In some embodiments, process 400 is executed by feedback attribution engine 224 of platform 102. Process 400 may be performed in real-time as part of ingestion processing of the feedback item, or may also be evaluated as part of a batch process (e.g., run periodically on a daily basis, weekly, monthly, when new information is updated in a CRM system, etc.). Process 400 begins at 402, when a feedback item pertaining to an entity is received. In some embodiments, as described above, the feedback item is collected from a source site. Examples of feedback data items include reviews, surveys, listings, social comments, search results, etc.

At 404, information pertaining to one or more candidate sources of the feedback item is received. The candidate sources may include potential origins/originators of the feedback item, which may include individuals or other entities.

In some embodiments, the information pertaining to the one or more candidate sources includes information pertaining to one or more individuals that are potential sources of the feedback item, and may include information associated with interaction events involving the one or more individuals and the entity. In some embodiments, as described above, the information pertaining to an interaction event includes information about an interaction or engagement that an individual had with an entity. In some embodiments, the interaction information is collected or received from an application such as a CRM system.

In some embodiments, the one or more candidate sources that are evaluated as potential sources of the feedback item are identified or otherwise selected based on characteristics of the feedback item. For example, candidate sources such as individuals may be identified based on a location (of the entity) pertaining to the feedback item, a time period based on a time that the feedback item was left, an interaction type, etc.

At 406, a probabilistic mapping of the feedback item to the one or more candidate sources is determined. In some embodiments determining the probabilistic mapping includes assessing the probabilities that the feedback item is attributed to the candidate sources or the likelihoods that the candidate sources are the source of the feedback item.

In various embodiments, as described above, determining the probabilistic mapping includes the following example steps. Features of the feedback item are extracted. For each candidate source, features of information pertaining to a given candidate source are extracted. In some embodiments, this includes determining features from interaction events that occurred between the candidate source (e.g., individual) and the entity (or a location of the entity).

In some embodiments, for each pair of the feedback item and a given candidate source in the identified candidate sources, an attribution feature vector is determined based on the feedback item features, the features associated with the given candidate source based on their interaction event(s), or both.

In some embodiments, the attribution feature vectors determined for the identified candidate sources are provided together as input to a feedback attribution model. In some embodiments, the model is a machine learning model. One example of such a model is a multinomial linear regression model. Other types of models may be used. In some embodiments, the model includes a variety of factors. In some embodiments, the factors or components indicate different types of matches between features from the candidate source-side and the feedback-side. The matches may be indicated in various ways, such as Boolean values (e.g., True or False or 1 and 0), or with similarity scores with thresholds to determine how closely the values for a feature/factor match between candidate source-side and feedback-side data. Other data may also be included in the feature vector, such as a score for how rare specific values for features are (e.g., how rare specific names or models of vehicles are), which may be used to improve the accuracy of the feedback attribution processing.

In some embodiments, the entity is associated with a particular industry, and the feedback attribution model that is used is tuned for the particular industry, where different industries are associated with different models. Various examples and details of training such a model are described above.

In some embodiments, the model provides as output a probability distribution vector, where the probability distribution vector includes, for each candidate source in the identified candidate sources, the probability that the feedback item is attributed to a given candidate source (e.g., the measure of likelihood or confidence that the given candidate source is the source or origin of the feedback item). This includes determining, for example, the probability that an individual authored or left the feedback item. Various examples of processing based on the output probability distribution vector are described above.

Employee Attribution

Authors of reviews may mention or refer to employees that they had interactions with. However, reviews oftentimes are not explicitly clear on which employee is being mentioned. For example, there may be incorrect spellings, only the use of first names (where there may be multiple employees with that name), the use of initials, the use of nicknames, a first name that is incorrectly remembered and mentioned, language barriers, etc., which may make it difficult to ascertain what employee should be attributed to the review.

Described herein are techniques for employee attribution. Using the techniques described herein, probabilistic attribution of an employee of an organization to a feedback item is performed. Using the probabilistic feedback attribution techniques described herein, employees may be attributed to feedback items. For example, for a given feedback item, an entity referred to in the text of a feedback item may be matched with one employee versus another one.

In some embodiments, probabilistic employee attribution includes receiving a piece of feedback. The piece of feedback pertaining to an organization (or location of a multi-location organization) is processed to extract all of the named individual entities referred to or mentioned in the piece of feedback (e.g., in the text of the feedback). The named extractions will depend on the text of the piece of feedback that the feedback author wrote, and may vary from mentioning both full first names and last names, to only first names, only last names, nicknames, only initials, etc. In some embodiments, each name extraction is tagged with a set of contextual attributes. For example, a name extraction is tagged with its corresponding location. Other contextual attributes may be obtained, such as information pertaining to customer interactions related to the piece of feedback.

In some embodiments, a set of known employees of the organization is identified as a set of candidate employees that is evaluated to determine, for each candidate employee, the probability that the candidate employee matches to a name extraction. This may include scanning records of the organization to identify candidate employees that could potentially have serviced that location during a certain time interval (e.g., a window of time prior to when the piece of feedback was left or posted or published). For example, the known employees that are most likely to have actually serviced the location at the time of a review are identified. In some embodiments, this includes excluding those employees that may have worked for the company at some point, but were not employed at the time that the review was written.

In some embodiments, an assessment is made of the probability that a candidate employee matches to a name extraction. In some embodiments, the assessment is based on an evaluation of the information extracted from the piece of feedback against the information pertaining to known employees and transactions/interactions to determine a probabilistic match. Based on the probabilistic matching, a determination may be made, for example, as to the likelihood that a given employee was responsible for helping a customer of a business.

Figure 5:
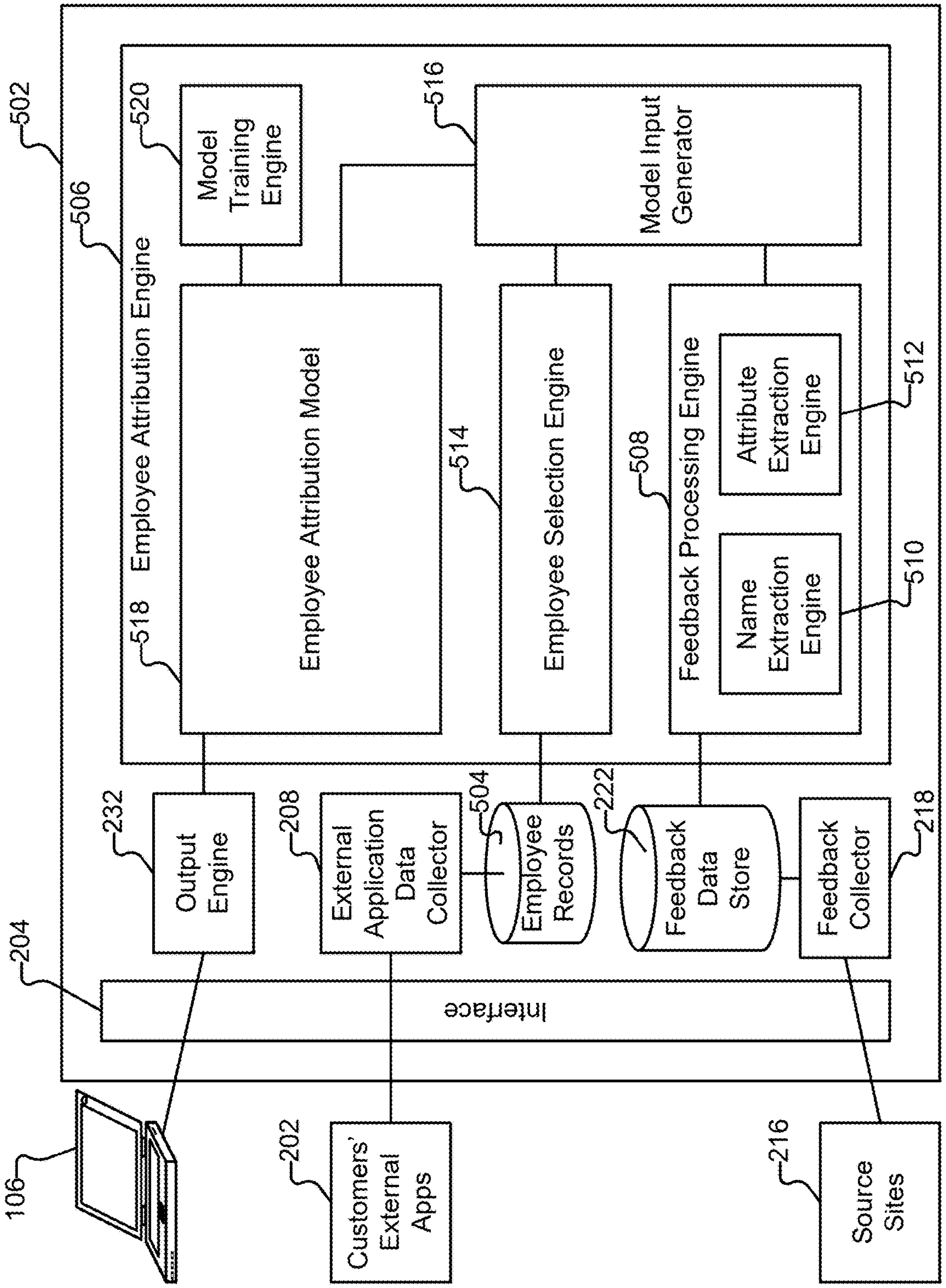
FIG. 5 illustrates an embodiment of a system for performing employee attribution.

FIG. 5 illustrates an embodiment of a system for performing employee attribution. In some embodiments platform 502 is an alternate view of platform 102, and includes components for performing employee attribution.

Collected Feedback

In this example, feedback is collected by feedback collector 218 from various sources 216. The collected feedback is stored to feedback data store 222. Various processing may be performed on collected feedback, as described above.

Employee Records

In this example, platform 502 maintains a record of employees for each location of a tenant. In some embodiments, the employee records are stored in employee records 504. The employee information may be obtained in various ways. As one example, the employee information is collected from a tenant's external application, such as a CRM system. In other embodiments, the employee records are uploaded by an end-user (e.g., by uploading a file such as a spreadsheet). The employee records may also be populated via a web interface. For example, a doctor who wishes to manage their online reputation may provide to the platform information about themselves. Examples of fields in records maintained for the employees of tenants/locations include names, employee identifiers, active/inactive status, etc. In some embodiments, the information is periodically updated (e.g., to reflect changes in active/inactive status). In some embodiments, timestamps associated with when employees become active/inactive are also maintained by the platform.

The following is another example of obtaining employee information. In some embodiments, the employees of an organization are inferred, derived, or otherwise determined from the history of reviews for a location. For example, the frequency of historical name mentions (e.g., name entities extracted from feedback items by name extraction engine 510, described in further detail below) is used to determine whether a certain name is an employee. For example, if a name has appeared 100 times in the past, and it appears again in reviews, then the extracted name is predicted or determined to belong to an employee. In some embodiments, comparison and matching of the extracted person names are performed to usernames (e.g., those names stored by and known to the platform). Clustering and grouping of names may also be performed (e.g., to determine that multiple extracted named entities refer to a single, same named entity or employee). A combination of employee data and feedback data may be used.

In some embodiments, employee attribution engine 506 is configured to perform employee attribution. As will be described in further detail, in some embodiments, performing employee attribution includes determining which employee(s) (e.g., in employee records 504) are mentioned in, referred to, contributed to, or are otherwise attributed to a piece of feedback (e.g., a review left by a customer of a location).

In some embodiments, the employee attribution processing is performed on a time-driven basis. For example, the employee attribution may be performed on a periodic basis. As one example, the employee attribution is performed daily, as a batch process, on feedback that has been collected within the last day. In this example, the feedback from the last day is collated into a single place (e.g., a temporary staging data store).

Processing a Feedback Item

In some embodiments, feedback processing engine 508 is configured to process a feedback item (e.g., feedback item in a daily batch of feedback items being processed). In this example, feedback processing engine 508 includes name extraction engine 510 and attribute extraction engine 512.

Name Extraction

Suppose that a customer leaves feedback in the form of a review, where the text of the review happens to mention an employee by name. In some embodiments, name extraction engine 510 is configured to perform named entity recognition, including extracting named person entities in the text of a feedback item (e.g., extracting objects/entities that are associated with names). In some embodiments, performing name extraction includes identifying first names, last names, initials, etc.

In some embodiments, libraries are used to implement the named entity recognition. For example, SpaCy may be used to perform the name extraction. In other embodiments, networks such as convolutional neural networks are used to implement the name extraction.

Extracting Contextual Attributes

In some embodiments, attribute extraction engine 512 is configured to extract contextual attributes associated with the extracted names.

One example of contextual information is the identifier of the location associated with the feedback item. In some embodiments, the location identifier is used to determine organization names.

Industry-specific contextual attributes may also be obtained (if available). For example, suppose that the feedback item is an auto dealer review. Metadata such as the below may be available as metadata from the review:

Department (e.g., parts, sales, service, etc.)
Car model
Car make
Date of Visit

In other embodiments, such metadata attributes may be obtained from CRM data, as will be described in further detail below.

In some embodiments, obtaining contextual information includes determining applicable event, transaction, or interaction information. As one example, applicable CRM data (e.g., collected via the external application data collector 208) may be identified and utilized. For example, if the feedback item is a review left for an auto dealer, applicable customer transaction information may be determined.

As one example, the date/time associated with the feedback item (e.g., date that the feedback item was left or authored), as well as extracted named entities, are determined. Such information may be used to narrow down or filter to a subset of CRM data. In some embodiments, for this CRM data, a match of the CRM data is made to the feedback item based on a variety of factors (e.g., car model, type of service, etc.). Further details regarding matching to CRM transactions are described above.

Another example of contextual attribute information includes information aggregated from other feedback items authored by the individual that left the piece of feedback from which a named entity is extracted. For example, probabilistic feedback attribution, as described above, is performed to probabilistically determine who left the piece of feedback being evaluated. In some embodiments, all of the other pieces of feedback written by the author on other source sites are aggregated to determine an online persona, where all of the author usernames for the reviews are associated with the same person (where the same person may have different usernames on different review sites).

Information from other reviews by the same author may be extracted to supplement the information used in probabilistic feedback attribution (e.g., to perform matching). For example, an individual may write a review for an auto dealership on Google, and then write a similar review on Yelp for that same auto dealership. Using the probabilistic feedback attribution described above, those two reviews may be associated with the same individual. When performing employee attribution on one review, metadata may be extracted for not only the review being evaluated, but also from any other related reviews determined to have been left by the same author. In this way, various attributes may be aggregated or grouped together.

In some embodiments, each recorded name extraction is associated with the corresponding set of extracted contextual attributes. For example, the named entity extractions may be stored in a table, where each named extraction is associated with a corresponding identifier of the feedback item from which the name was extracted, a rating identifier, a location identifier associated with the feedback item, as well as a tenant identifier (if the location is one location in multiple locations operated by the tenant). As will be described in further detail below, given an extracted named entity and extracted contextual information, the probability that any given employee matches to the extracted named entity is determined.

Candidate Employee Selection

Employee selection engine 514 is configured to select candidate employees to evaluate to determine their likelihood of matching to one or more of the named entities extracted from the text of a feedback item. In some embodiments, the employees are all employees for a given location. The given location may be determined based on the location identifier associated with the feedback item.

In some embodiments, the employees are selected from a data store such as employee records 504. In some embodiments, all employees known by the platform that could service the location associated with the feedback item (e.g., were active) during a given window of time are identified as candidate employees to be matched against the name extractions. In various embodiments, the applicable window of time is based on a time that the feedback item was authored, published, posted, etc. Such temporal information about the feedback item may be stored with the feedback item in the feedback data store (e.g., by tracking and recording timestamps related to feedback items).

This results in the generation of a list of all possible employees that can be matched over. In some embodiments, based on the querying, for each candidate employee, attributes of the employee are also obtained, such as whether they were active or inactive, their first name, their last name, their phone number, their location, their role, their job title, etc.

In some embodiments, the set of candidate employees is determined by querying the employee records data store. For example, the employee records data store is queried for employees that match the location of the feedback item and that had an active status for an interval of time to match over. For example, a query may be made to the employee records data store for all employees of a location that were active between the time interval of 12/1-12/15. For example, in some embodiments, feedback items are collected on a daily basis (e.g., to capture the new feedback items that have been posted in the last day). In some embodiments, the feedback items collected for the last day are also evaluated for probabilistic employee attribution. The active candidate employees that are queried for may include those candidate employees that were active in the last day (corresponding to the time period of when the evaluated feedback items were collected or posted). In this way, the list of candidate employees will only include candidate employees that had actually been active and could have been referred to by the author of the feedback item.

Although a review may be collected on a certain day, it may refer to events that occurred in the past. For example, although a person left a review in March, it may be for an interaction that occurred several months ago, during which time an employee referred to in the text of the review may have become inactive. In some embodiments, the platform maintains or monitors employee status and records timestamps for when the active/inactive status changes. In this way, employees that were active for a given time period may be identified.

The following are examples of attributes extracted from each employee:

first & last name tenant id (employer)

location uid (location where employee is authorized to)

An example of this would be:

name: Diego Villalta tenant_id: 92032 location uid: 1854302

In some embodiments, using probabilistic feedback attribution, a feedback item may be probabilistically matched to an interaction or transaction (e.g., by using the probabilistic feedback attribution described above). The transaction may be associated with a date (e.g., date of a service). The date may be used to select candidate employees for processing.

Generating an Input Feature Vector

Model input generator 516 is configured to generate an input to the employee attribution model to perform probabilistic attribution of an employee to a feedback item.

In some embodiments, generating an input includes creating an input vector to be processed by employee attribution model 518. For example, the model will be used to determine, for a given extracted named entity (extracted from the feedback item) and a given candidate employee (from the list of selected candidate employees), the probability that the given candidate employee matches to the given extracted named entity referred to in the feedback item.

In some embodiments, the model input generator is configured to generate an input vector for the pair of the given extracted named entity and the given candidate employee. The feature vectors may be similar to those described in the context of probabilistic feedback attribution, adapted for employee attribution. In some embodiments, the input vector includes various features, where the features encode various information about the extracted named entity, the candidate employee, as well as contextual information. As one example, the input feature vector is determined by comparing various names and attributes.

In some embodiments, the model input generator generates input feature vectors for various pairs of a given extracted named entity and candidate employees. This may result in an input table.

In some embodiments, generating the attribute input vector includes encoding comparison of the extracted name with a given employee name, as well as encoding matches/mismatches in various contextual attributes.

As one example, one factor in the input feature vector is whether the location of the feedback item matches to a location of the candidate employee. This factor may be assigned a value of "1" if the locations match, and "0" if they do not.

As another example, one factor in the input feature vector is used to encode whether there was a match in the roles. If a role were extracted from the text of the feedback item, and it matches the role of a candidate employee, then this role factor may be assigned a value of "1." A separate role mismatch factor may be included in the input feature vector to encode that the roles were a mismatch (e.g., assigned a value of "1" if the extracted role does not match the role of the candidate employee).

In some embodiments, contextual information (e.g., likely associated service appointments), as well as the type of interaction indicated based on NLP of a feedback item may be incorporated into the employee attribution model. The type of interaction indicated by an analysis of the attributes of the feedback item may then be evaluated in conjunction with other attributes of the employee, such as their role (e.g., sales advisor, service advisor, etc.) to determine the probability that the given employee was referred to in the review. For example, the role of an employee and the likely type of interaction extracted from the feedback item may be included as features in an employee attribution feature vector. The role may be useful in certain industries such as hospitals, such as in the case of reviews for hospitals (an example of which is described in further detail below), where there is less likely to be collision on names in certain roles such as cardiology.

As another example, the results of comparison of the name of an extracted named entity and a candidate employee's name are encoded in the feature vectors. In some embodiments, a string comparison/matching is performed between an extracted name and a candidate employee's name. As one example, a string distance between the extracted name and the candidate employee name is computed, such as a Levenshtein distance. This may include determining the number of additions, deletions, and changes on a per-character basis in order to transform the extracted name to the candidate employee name or vice versa. In some embodiments, phonetics is used in the string matching algorithms to determine an amount of match and improve accuracy of the matching assessment. The results of the comparison (e.g., the distance between strings) may be provided as values for various factors in the feature vector.

While a candidate employee name provided by a tenant may include both a first name and a last name, the names extracted from the text of a feedback item may not. For example, the names extracted from the text of feedback items may include only first names, nicknames, initials, etc., making it difficult to determine what employee (if any) is being referred to in the text. The distance computed between different portions of the extracted names and candidate employee names may change based on what types of strings are being matched, such as whether a full first name was able to be matched, or whether there is only a match on an initial, etc.

In some embodiments, the feature vectors include various factors for encoding the amount of match between different corresponding parts of names, such as first names, last names, nicknames, initials, etc.

Running the Employee Attribution Model

Employee attribution model 518 is configured to take the generated feature vectors as input to determine the probabilities that employee candidates are being referred to by a customer (of the business) in a feedback item. In some embodiments, the employee attribution model is implemented using a machine learning model such as a regression model.

Output of Probabilistic Employee Attribution

Output engine 232 is configured to generate output based on the determinations made by employee attribution model 518. One example of an output of the probabilistic assessment is a data structure such as a table that lists, for a given name extraction and a set of evaluated candidate employees, a list of probabilities indicating the likelihood that each candidate employee of a location matches to a name extraction (and that that candidate employee is the one referred to in the piece of feedback). In some embodiments, a probability is generated for each pair of named entity extraction and candidate employee.

As one example, each row of the table pertains to an evaluation of an extracted named entity against a particular candidate employee. In some embodiments, the row includes a feedback identifier, which is an identifier of the feedback item from which a named entity was extracted. The extracted named entity may also be included in the row. In various embodiments, a tenant identifier, a location identifier, and a rating identifier are also included in the row. In some embodiments, the row also includes the text (or portion of the text) of the feedback item from which the named entity was extracted. In some embodiments, a name of the candidate employee is included in the row. An employee identifier (e.g., referencing the candidate employee's record in the employee record data store) may also be included in the row. In some embodiments, a row of the output also includes a score, where the score represents the probability of a match between the candidate employee and the extracted named entity. For example, the score may be in a range of 0 to 100, with 100 indicating a high probability match, and 0 indicating a low probability match.

The following is an example of an output of the employee attribution model.

In some embodiments, a single match output generates the following fields:

- feedback id (can be cross-referenced to the actual feedback that could be found on yelp, maps, etc.)
- tenant id (employer)
- location uid (location where the review was found, e.g., "Daly City")
- user id (id of the employee for which a matching score was determined)
- source (review text, survey, etc.)
- score (approximate number from 1 to 100 that indicates a match)
- name of employee The following is an example of an actual output of such a match:

- review id (an example of a feedback identifier): 9876 DEALER RATER.AbcDeFg1234_imcA.9876543 tenant id: 9876
- location uid: 1203434
- user id: 23102310
- source: text_ner (named entity extraction from review text)
- score: 100
- name: Cory w. Fox
- text in review: cory fox It may be the case that there is more than one candidate employee that matches to a named entity extraction. In some embodiments, if two candidate employees have the same likelihood of being a match, they are both given an equal score. In this example, in the absence of additional differentiating information, the platform assesses that both candidate employees are of equal likelihood. In other embodiments, the probability scores generated for the various candidate employees with respect to a given named entity extraction are normalized such that they sum to 100%.

In some embodiments, the matching table (which includes the probabilities that an employee was mentioned in a review) is determined on a periodic basis (e.g., based on the periodic evaluation of collected feedback, such as that collected in the last day). In some embodiments, the output of the daily employee attribution is moved into a global table, where the probabilistic employee matches are collated to provide a more historical view of employee attribution to feedback items.

In some embodiments, the platform provides user interfaces for viewing information regarding employees. For example, in some embodiments, an employee's record in the employee record data store includes a set of all feedback items that have been attributed to or refer to the employee. In some embodiments, via a user interface showing information about an employee, the user interface also provides links to the feedback items to which the employee is attributed (where an end user may click on the links to view specific reviews). In some embodiments, summaries of the attributed feedback items are shown.

In some embodiments, the output of the probabilistic employee attribution may be used to determine targeted suggestions and recommendations on how to improve probabilistic employee attribution. For example, recommendations can be made to employees on how they can instruct customers to write reviews, such as to include a full name. In this way, the sales people can be informed on how to direct people to leave feedback so that the sales people receive the proper attribution.

Alerts may also be sent based on the results of the probabilistic employee matching. As one example, an alert may be sent to an employee in response to attribution of a feedback item to them (or it is determined that that employee is likely to have been mentioned or referred to in a feedback item). As another example, alerts may be sent indicating feedback items that had text that included names, but that could not be attributed to any known employees.

In some embodiments, each evaluated piece of feedback is associated with a vector of probabilities that various employees were mentioned in the feedback item. In some embodiments, each employee in the record store includes a link to a piece of feedback to which they are probabilistically attributed, along with the probability that they were mentioned in the feedback item. Other examples of information collected in the employee record include a list of feedback item identifiers, such as review identifiers. In various embodiments, for each review, the date of/review, overall rating, and an assessment of the reviewer's sentiment with respect to the employee in particular are also included in the employee record. Such information may be used, for example, to determine the average sentiment of reviews attributed to certain employees. For example, for a given employee, a list of the feedback items attributed to them is stored. For example, a list of the identifiers of the feedback items attributed to the employee is stored. When determining the average sentiment of feedback items attributed to the employee, the feedback items attributed to a certain employee may be aggregated based on the stored identifiers. The average ratings of the feedback items may then be computed. In this way, whether the employee contributes positive or negatively from a feedback sentiment perspective may be determined.

Figure 6A:
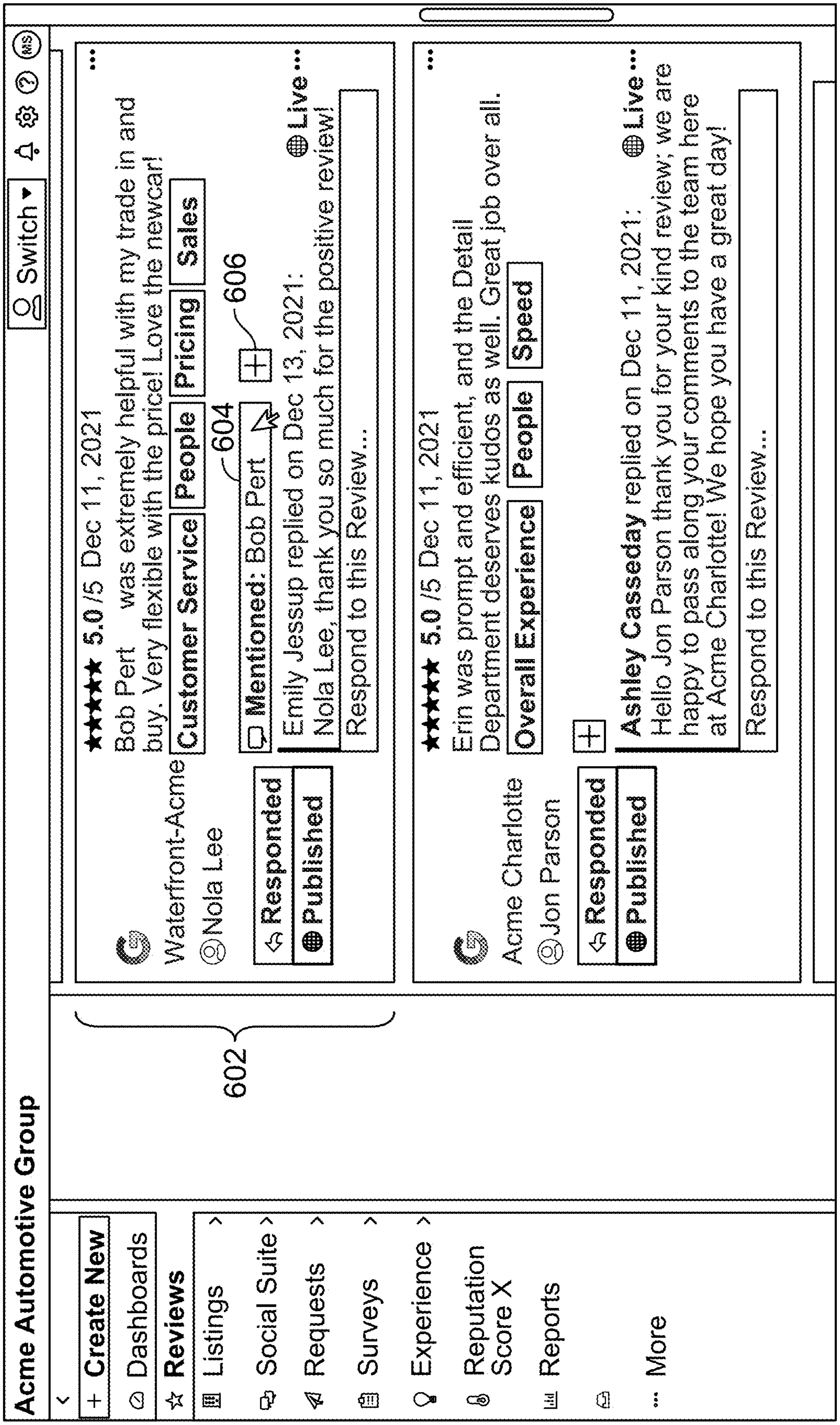
FIG. 6A illustrates an embodiment of an interface.

FIG. 6A illustrates an embodiment of an interface. In this example, reviews of a location are shown. As shown in this example, for each review, any mentions of employees determined by the platform are presented. In some embodiments, if a review has no text, then no attribution is shown. As shown in this example, the system is configured to automatically add or suggest mentions to reviews. In this way, a user need not manually perform employee attribution directly.

In this example, the text of the review shown at 602 mentions a "Bob Pert" that was extremely helpful. The suggested employee that was most likely to be the person mentioned in the review, as determined by the platform, is displayed at 604, which presents the employee attributions determined by the platform (employees determined by the platform to be attributed to the review). As shown in this example, the interface includes a user input option (606) to manually add an employee that is attributed to the review. An end user may use such a manual option when they believe that the suggested employee attribution is incorrect, they believe an attribution was missing, etc. An example of manually adding an employee is described in conjunction with FIG. 6B, below.

Figure 6B:
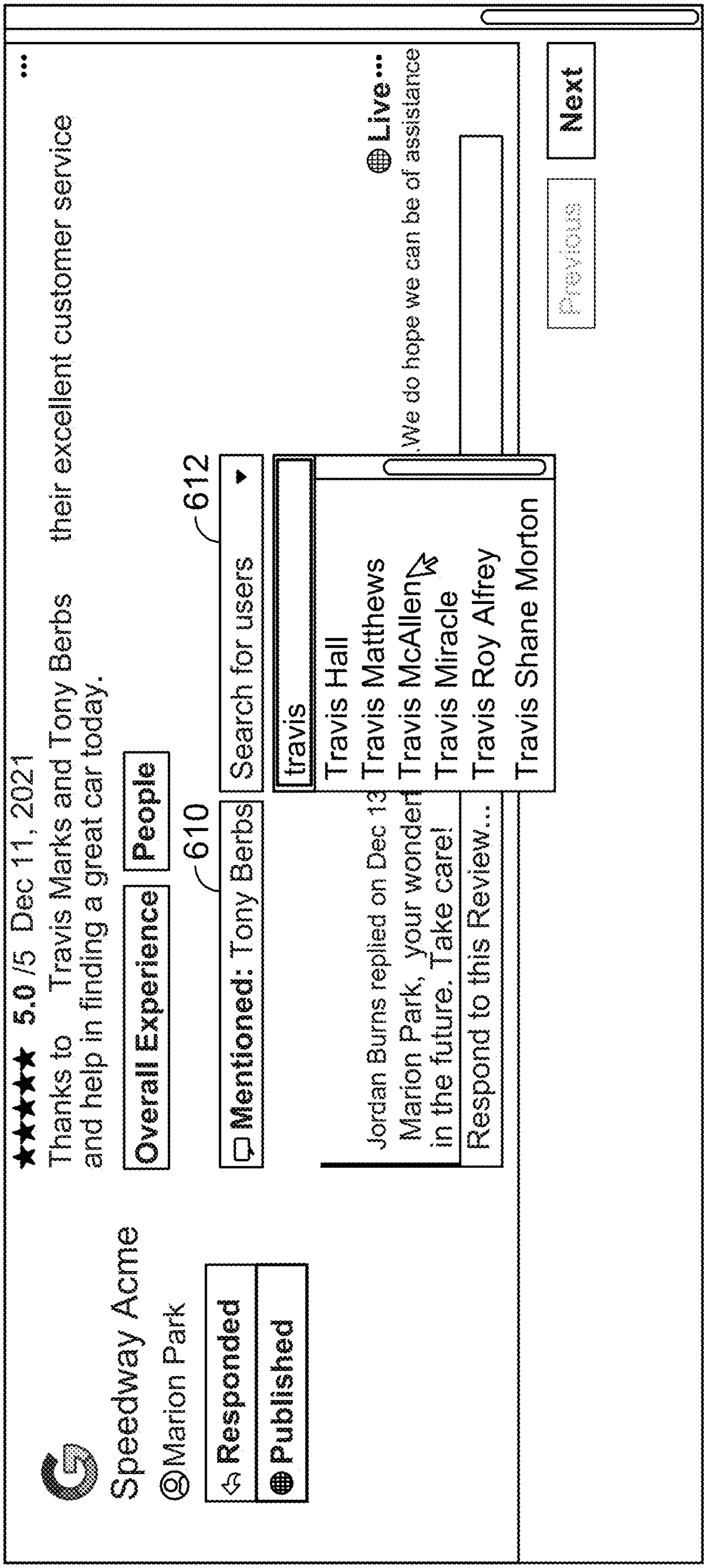
FIG. 6B illustrates an embodiment of an interface.

FIG. 6B illustrates an embodiment of an interface. An example of a review is shown. As shown in this example, the text of the review included the names "Tony Berbs" and "Travis Marks."

As shown in this example, while a known employee Tony Berbs was correctly identified at 610 as having been mentioned in the review and being attributed to the review (e.g., using the probabilistic employee attribution techniques described herein), no employee matching to "Travis Marks" with high enough confidence or probability was identified.

As shown in this example at 612, the user is presented an option to manually select or search for employees to indicate as having been mentioned by the review. The candidate employees may be determined from the employee records data store. If the user selects an employee, the attribution of the employee to the review is recorded by the platform. For example, a reference to the review is stored to the selected employee's record. The review's record in the feedback data store may also be updated to include a reference to the selected employee, indicating that the employee had been mentioned in that review.

In this case, the absence of a match (that is, for example, above a threshold level of confidence or probability score) to "Travis Marks" may be an indication that the platform has not been updated with Travis Marks, or that there is a new employee at the location that does not yet have an employee record. In some embodiments, if a named entity is unable to be matched to a known employee with a threshold amount of confidence, the interface is configured to display a message asking an end-user whether the extracted named entity is an employee.

For example, the platform can cause a message to be surfaced that indicates that a Travis Marks was mentioned and extracted from the review, and then ask the end user whether they are an employee. The interface may include an option for allowing the user to input either yes or no. Further information may also be provided by the user via various presented input fields. In some embodiments, the platform monitors and counts the number of times a name extraction is observed across feedback items.

In some embodiments, as data across multiple reviews is gathered, and it is determined that the named entity Travis has been mentioned multiple times, the confidence that Travis is an employee may be increased. For example, in some embodiments, for each extracted named entity, the number of times that named entity is mentioned is recorded (even if the extracted named entity has not yet been attributed to any known employee with a threshold amount of confidence).

Validation

In some embodiments, the list of probabilistic matches between a named entity extraction and candidate employees is provided to an end-user via a dashboard or other type of graphical user interface. In some embodiments, an end user may evaluate the matches and manually indicate whether they are correct or incorrect. The user interface may also be configured to provide an option to allow an end user to accept probabilistic matches generated by the platform.

In some embodiments, a user interface is provided that shows, for extracted name entities, the candidate employees and the probability that they match. In some embodiments, which probabilistic matches to present via a frontend for validation is determined based on corresponding probability scores. As one example, the user interface provides as output the candidate employee that has the highest probability or confidence of a match to the extracted named entity. In some embodiments, via the dashboard interface, the end user is provided options to validate the probabilistic employee matches, such as to choose whether the matches predicted/estimated by the platform are correct or incorrect.

In this way, an end user can accept or decline the automatic, machine-generated probabilistic assignments. In some embodiments, if there are multiple employees that are presented as matches with equal probability, then a user may manually select which employee is the correct one to attribute to the review. The manual selection of one candidate employee versus another may be used as historical information to improve future matching. For example, as will be described in further below, the end user validation may be used as feedback for updating the training data set for training the probabilistic employee attribution model.

Bootstrapping of Employee Information

In some embodiments, tenants provide information about their employees to the platform. This includes importing employee configuration information such as employee names, titles, departments, etc., as described above.

In some embodiments, employee records are generated based on historical name extractions from feedback items for locations of a tenant. This is referred to herein as "bootstrapping" of employee information. For example, service advisors of a dealer tenant may not have access to the platform, and not all nurses at a hospital may be users of the platform (and using it to manage their online reputation), in which case they may not be creating employee records for themselves on the platform. Further, their information may not have been uploaded by the location or tenant.

In some embodiments, historical data extracted from reviews, such as name extractions, may be used to bootstrap the list of known employees. For example, the list of known employees may be bootstrapped out of metadata from feedback from sources that include structured data. Metadata obtained from CRM integrations and surveys that are sent out may also be used to bootstrap the list of employees. The bootstrapping may be performed at various points of the employee attribution process and used to enhance and ensure the quality of the list of employees. For example, the bootstrapping may be used to update the list of employees in the event that tenants do not provide the platform with the history of current employees, past employees, etc. Thus, such information may be derived from analysis of feedback items and employee attribution analysis.

Name Variant Maps

In some embodiments, an employee is associated with a nickname or name variant map. The model may be updated with nickname maps to improve the accuracy of the model. For example, an employee may have various nicknames or variants of their names that are referred to in feedback items. For example, the same employee may be referred to as Giovanni, Gio, Giovani, Giovany, etc., which is recorded in that employee's record.

In some embodiments, in addition to matching directly on an employee's name as it appears in a record, possible nicknames may also be evaluated. For example, matching maps may be generated that indicate a one-to-many relationship based on employee name and potential nicknames that that employee name may also be associated with. The matching map may then be used to improve the accuracy or the probabilistic employee attribution.

In some embodiments, historical feedback data may be used to generate such matching maps. As one example, suppose that an employee, "Richard," is attributed to several reviews. Several of the attributed reviews include the nickname "Dick." In some embodiments, based on the frequency of the occurrence of the nickname "Dick" in the attributed reviews, the nickname "Dick" is mapped to Richard in a matching nickname map.

As another example of historical feedback, user validation of probabilistic employee attribution may be used to create the matching map. For example, an end-user can validate that a predicted employee is attributed to a given feedback item, indicating that that feedback item matched with one employee versus another one. If the name "Dick" is extracted from the review, and the user confirms or manually indicates that the employee with the name "Richard" is attributed to the "Dick" extracted from the feedback, then "Dick" may be mapped to "Richard" as a nickname in Richard's employee record.

In some embodiments, the commonality of certain observed nicknames with respect to employee names may also be taken into consideration when generating the matching maps.

The following is an example of using nicknames. Suppose an employer manually assigns multiple reviews that contain "jon," "johnny," and "john" to a specific employee named "john doe" (e.g., via the user interfaces described above). The employer is indicating that these other nicknames actually refer to this employee, so if the platform observes these names in the future, the platform automatically assigns them to john doe. Thus, the employee attribution utilizes not only the employee's actual name for matching, but multiple nicknames as well.

Training the Employee Attribution Model

Model Training Engine 520 is configured to train the employee attribution model 518. In some embodiments, the output of the employee attribution model generates, for each pair of named entity extraction and candidate employee, a likelihood that the candidate employee matches the extracted name.

In some embodiments, training the model includes generating a training data set. In some embodiments, a training data set includes a set of labeled input employee attribution feature vectors, where the input feature vector includes values encoding information pertaining to an extracted named entity and a candidate employee name (and other contextual information), along with a label indicating whether the extracted named entity and the candidate employee name are a match.

As described above, validation of probabilistic employee matches may be performed. In some embodiments, the training data set is updated based on user validation or input with respect to probabilistic matches made by the probabilistic employee attribution model. This will allow the model to more closely match to what a human would decide as correct.

For example, the output table generated from the employee attribution (which indicates the probability or confidence of matches between extracted named entities and candidate employees) may be stored. The corresponding input employee attribution vectors may also be stored. The user validation (via a user interface) may be used to label a corresponding output vector as resulting in a correct or incorrect probability. The labeled output table may then be incorporated into a training data set.

As another example, historical mappings/validations may be used to update the training data set. For example, suppose that based on historical observation, it is determined that for a given location, a salesman named Adam is always attributed to reviews, while an accountant for the same location, also named Adam, is never attributed to reviews. The model may be updated to determine that certain roles (e.g., salesman) are more likely to be mentioned in reviews than other roles (such as accountants at a dealership). This may be done by weighting such factors higher. The likelihood of certain roles being mentioned in feedback items may vary by industry.

As described above, machine learning (such as multinomial logistic regression) may be used to assess the probability that an employee matches to a named entity in the text of a feedback item. The following are example potential factors for the auto dealer industry:

First name match
First name mismatch
First name match—nickname
Last name match
Last name mismatch
Vehicle make match
Vehicle make mismatch
Vehicle model match
Vehicle model mismatch
Location name match
Location name mismatch
Review within 3 days
Review within 7 days
Review within 30 days
Sales experience match
Sales experience mismatch
Service experience match
Service experience mismatch
Agent first name match
Agent first name mismatch
Agent last name match
Agent last name mismatch In the above example, the "agent" related factors are those pertaining to an employee.

The following is an example of training an employee attribution model. Suppose that the above data is used as training data. Using the above factors, each of them is taken as a binary variable (0/1). If, for instance there is no first name, there would be a 0 value for all 3 of the first variables. These are examples of the input variables. For 100 named entities×1000 candidate employees, there is a row of data for each named entity and candidate employee (so 100,000 rows of data). For each row, the input variables are assessed. The output variable is whether or not this named entity relates to this employee. That is manually tagged for each named entity (0/1). A logistic regression is then fit to that data to provide weights for each factor.

Direct Attribution from Requested Feedback

In some embodiments, the platform allows end users such as employees to make review requests from employees to customers. These may provide a type or form of more direct attribution. For example, the review request may include a link. If the user clicks on the link, they may be directed to a particular review site, where a review or other feedback item may be pre-populated (e.g., according to a survey). In this case, the review generated from the click through may be recorded by the platform.

In this example, where a customer of the location writes a review based on that review request, a direct link may be made (attribution of the review to the employee), without having to evaluate text of the review, as described above (e.g., to perform a probabilistic attribution). In this example, the path from the employee to the review mentioning the employee has been established through the review requesting and link clicking. This allows for a "perfect" attribution. When such a direct attribution cannot be made through a technology path, probabilistic employee attribution may be performed based on the review text, as described above.

Probabilistic employee attribution may still be performed even when a review or survey request has been made. For example, when performing a survey, an individual may be asked to write a review online after doing the survey. Even with the request, attribution may be lost, as in some cases, they may exit out of the ecosystem of the platform and go to a source site on their own where they may have an account (and not follow through with clicking on the link in the request to leave the review). While an estimate may be made that the author left a review on a certain day, there is not a direct or explicit indication or signal back to the platform that the review has been left upon interaction with the review request.

In this case, probabilistic employee attribution may be performed. For example, probabilistic feedback attribution may first be performed to determine that a review author is related to a transaction. This information may also be used to determine whether the author was sent a review request. That transaction may then in turn be associated with an employee. The review may then be attributed to the employee.

The following is an example of using information from surveys as a factor when performing probabilistic feedback attribution. In some embodiments, after the user has performed a survey, they are invited to click a link to leave a review on a source site. In some embodiments, the text of the online review is automatically filled with the context of the survey. In some embodiments, in response to clicking the link, an application interface is loaded, where the review text is pasted from the survey. In this path, where the review is generated in response to clicking of the link, a signal may be sent back to the platform, directly attributing a feedback item to the survey, allowing for direct knowledge of employee attribution.

However, similar to the example described above, users may leave the preconfigured path to leave feedback from the survey, and instead of clicking on the link to generate a review, may go to the platform on their own to leave a review (and thereby breaking the connection to the survey). However, the user may write the review based on the text of the survey (e.g., by copying the survey text into the review, or making slight modifications). For example, even if the user is sent a feedback request, they may not click the link, and instead independently write a review that is not even directly related to the survey that they had previously filled out. Here, there is not a click through that is recorded. Probabilistic employee attribution may be used to determine what employee a mentioned name refers to.

For example, in some embodiments, after collecting a review, survey data may be compared to the text of the online feedback that was posted to determine how closely they match. In this way, the probability that the review is attributed to a survey is determined. The transaction linked with the survey may then be determined, as well as what employees were associated with the transaction. Thus, such information may be used to perform probabilistic employee attribution.

Examples of Probabilistic Employee Attribution

Hospital Industry Example

The following is an example of performing probabilistic employee attribution on feedback items pertaining to a hospital. For example, suppose that a hospital, Acme Oakland, has 100 reviews written by customers, and 1000 doctors. Using the probabilistic employee attribution described herein, a determination may be made as to which doctors or staff were referred to by a feedback item, as well as which doctors or staff directly contributed to a positive or negative review as written by the customer.

The following is an example of a review. In some embodiments, the feedback item is obtained from feedback data store 222. In this example, the review from the Acme Oakland hospital includes the following example text:

"My dad has been seen and admitted at the Acme Hospital for various issues.

He has received great treatment and received great care from the doctors and nurses at Acme for all the cases. I thank the doctors and nurses from the bottom of my heart.

I'd like to especially call out

1. Dr Miles from Cardiology
2. Nurse Saras from Cardiology
3. Dr Dolores in ENT"

In this example, the name extraction engine extracts out the following named entities from the text of the review:

1. Dr. Miles
2. Nurse Saras
3. Dr. Dolores

As shown in this example, various last names were extracted (with no first names).

Contextual information associated with the named entities is also extracted from the text of the review.

In this example, the titles of the individuals are extracted (e.g., "Dr." and "Nurse"). The roles or specializations of the named extracted entities are also extracted (e.g., cardiology for Dr. Miles and Nurse Saras, as well as ENT for Dr. Dolores."

In some embodiments, each named entity is also associated with other attributes such as an identifier of the feedback item from which the named entity was extracted, an identifier of the location with which the feedback item is associated, an identifier of the tenant of which the location is a part of, etc.

In this example, candidate employees are identified. As one example, all employees working at the Acme Oakland hospital location are identified. This list may contain 100 candidate employees. For a given pair of a named extracted entity and a candidate employee, a corresponding employee attribution input vector is generated, as described above. The employee attribution input vector may include multiple weighted features/factors. The values for the features may be determined based on a comparison of the extracted named entities and a candidate employee, as described above.

Each employee attribution vector is provided as input to an employee attribution model. As output, for a given employee attribution input vector, the corresponding candidate employee is given a probability score that is a measure of the likelihood that the candidate employee is the person that the customer is referring to in the review. The determined probabilities may then be used to identify the most likely candidates that the customer (or relation of a patient in this example) is referring to in the review.

Auto Dealership Examples

The following are further examples of performing probabilistic employee attribution in the auto dealership industry. The probabilistic employee attribution described herein is beneficial for industries such as auto dealerships. For example, in the auto dealer industry, sales people would like to have the correct attribution to a person who may have made a vehicle purchase. In car sales, a correct attribution may mean an increase in that employee's bonus because they correctly sold the car to someone.

First Auto Dealership Example—High Confidence Match

In this example, a full employee name is mentioned in a review, and a high confidence match to an employee for that location will be found.

Suppose that the following review is left online on Jan. 11, 2022 by Bob Smith for a site relating to Waterfront Autos-"Love Waterfront Auto, love my new Aero. Joseph James was super helpful."

Name extraction is performed on the review, resulting in the named entity "Joseph James" being extracted from the text of the review. In this example, the review mentions both a full first name and a full last name.

Additional attribute information may be extracted from the review, such as:

- Reviewer
- Date
- Source
- Verbatim
- Other data either provided or pulled from the review:
  - Vehicle
  - People interacted with
  - Actions
    - Test drive, phone call, online inquiry, . . .

In this example, suppose that the author of the review has also been identified based on probabilistic feedback attribution. Based on the feedback attribution, the particular transaction referred to by the review is also obtained (e.g., from CRM data about the particular transaction of a sale). Information associated with the transaction, such as the actual name of the salesperson who sold the car, may be obtained from the CRM data known to the platform.

The following is an example of associated CRM data that may be identified based on the probabilistic feedback attribution described above.

Robert Smith buys a 2022 Acme Aero on Jan. 6, 2022 from Sales agent Joseph James at Waterfront Auto

- Customer
  - Robert Smith
  - 2022 Acme Aero
    - Purchase date—Jan. 6, 2022
    - Service dates—vector
    - Other interaction dates and parties
    - Sold by—Joseph James
    - Finance—XXX Service Advisor Survey history—collection of surveys When requested Did he open Did he complete All results and verbatims Transaction Sales/Service/Parts/Inquiry Date Served by Details related to transaction Vehicle bought—year/make/model Date Related events—e.g., test drive, online inquiry, etc.

And their related details

Price

VIN

Sales agent

Finance liaison

A candidate list of employees is determined. The following is an example of a Waterfront Auto employees list including a list of candidate employees for which probabilistic matching to the extracted named entity is to be performed.

Joseph James

Joe Newton

Joey Daniels

Jeff Thompson

Debbie Adams

The extracted named entity, attributes associated with the extracted named entity (including CRM transaction/interaction data), along with information about the candidate employees may be combined to determine, for a given candidate employee, a confidence that the candidate employee matches the name extracted from the review.

The following are examples of factors included in an input employee attribution feature vector that is provided as input to an employee attribution model such as that described above. The below factors include those that are assigned, for example, a value of "1" (as being true), based on a comparison of the extracted name to a candidate employee name, as well as a comparison of various attributes from the review and CRM data.

Customer first name match-nickname

Customer last name match

Vehicle make match

Vehicle model match

Location match

Review within 7 days

Agent first name match

Agent last name match

Sales experience match

In some embodiments, the employee attribution model picks up each of these factors, and leverages a machine learning model (such as multinomial logistic regression) to apply a weight to each.

In this case the employee attribution algorithm is likely to assign a very high confidence that the employee Joseph James and the review match—e.g., 99%+, leaving a near zero probability for all other possibilities.

In this example, a high confidence match is able to be established based on matching of the customer name from the review to the transaction in the CRM, to information such as vehicle purchased, review date, employee name (first and last name in this example), etc.

Second Auto Dealership Example—Multiple Potential Matches

In the following example, only an employee first name is able to be matched on, where there is not a good match to customer/CRM data, resulting in multiple possible matches to employees.

In this example, suppose that a review is left online on Jan. 11, 2022 by ReviewsByR for a site relating to Waterfront Auto-"Love Waterfront Auto, love my new car. Joe Thompson was super helpful."

In this example, named entity recognition is performed on the review, resulting in the named entity "Joe Thompson" being extracted from the text of the review.

The review is further processed to obtain contextual attributes pertaining to the extracted named entity and the review. Examples of such attribute information include:

Reviewer

Date

Source

Verbatim

Other data either provided or pulled from review:

Vehicle

People interacted with

Actions

Test drive, phone call, online inquiry, . . .

In this example, suppose that there is not a high probability match to customer/CRM data (e.g. because the review is anonymous, and a high confidence probabilistic feedback attribution match could not be identified). For example, suppose that in this case, the below CRM interaction data is identified as potentially pertaining to the review, based, for example, on the review being with 7 days of this interaction event, the interaction event pertaining to the same location indicated in the review, and the interaction event pertaining to sales (which relates, for example, to the new car mentioned in the review).

Robert Smith buys a 2022 Acme Aero on Jan. 6, 2022 from Sales agent Joseph James at Waterfront Auto Customer Robert Smith 2022 Acme Aero Purchase date—Jan. 6, 2022

Service dates—vector

Other interaction dates and parties

Sold by—Joseph James

Finance—XXX

Service Advisor

Survey history—collection of surveys

When requested

Did he open

Did he complete

All results and verbatims

Transaction

Sales/Service/Parts/Inquiry

Date

Served by

Details related to transaction

Vehicle bought-year/make/model

Date

Related events—e.g., test drive, online inquiry, etc.

A And their related details

Price

VIN

Sales agent

Finance liaison

In this example, suppose that the following list of candidate Waterfront Auto employees is obtained:

Joseph James

Joe Newton

Joey Daniels
Jeff Thompson
Debbie Adams

The above information is used to generate an input employee attribution vector with a set of factors. The below factors include those that are assigned, for example, a value of "1" (as being true), based on a comparison of the extracted name to a candidate employee name, as well as a comparison of various attributes from the review and CRM data. Such factors include, for example:

- Location match
- Review within 7 days
- Agent first name (and also nickname) match to multiple employees without a last name match
- Agent last name match to employee without a first name match In some embodiments, the employee attribution model picks up each of these factors, and leveraging a machine learning model (such as logistic regression), applies a weight to each.

In this case, the algorithm may assign a 40% probability that this review relates to employee Joseph James (in part, for example, due to agent first name matching without a last name match, and Joseph James being involved in a CRM event that the review was within seven days of, and that had to do with sale of a new car), a 30% probability that it relates to Jeff Thompson (in part due to agent last name match without a first name match), a 10% probability each for employees Joe Newton and Joey Daniels (in part due to agent first name (nickname) match without a last name match), and a 10% probability that it was an unknown employee.

As shown in this example, this particular dealership location has multiple employees to which the "Joe Thompson" extracted from the review could be referring to. However, there is no single clear match (with threshold high confidence) to a known employee with the exact name "Joe Thompson." For example, there are employees named Joseph James, and Jeff Thompson, but no Joe Thompson.

Third Auto Dealership Example

In this example, only an employee first name is mentioned in the text of a review, where there are multiple possible matches to employees. However, in this example, there is a high confidence match on customer and date of visit. As will be shown in this example, associated CRM data is able to be identified, where the CRM data has an employee associated with that customer visit, yielding a high confidence match to a single employee.

In this example, suppose that the following review is left online on Jan. 11, 2022 by Bob Smith for a site relating to Waterfront Auto-"Love Waterfront Auto, love my new Acme Aero. Joe was super helpful."

In this example, named entity recognition is performed, causing "Joe" to be extracted.

Additional contextual attributes associated with the extracted "Joe" named entity may also be extracted, such as:

- Reviewer
- Date
- Source
- Verbatim
- Other data either provided or pulled from review:
  - Vehicle
  - People interacted with
  - Actions
    - Test drive, phone call, online inquiry, . . .

In this example, probabilistic feedback attribution such as that described above is used to identify a good match to CRM interaction data that has an employee associated with that customer visit.

For example, Robert Smith buys a 2022 Acme Aero on Jan. 6, 2022 from Sales agent Joseph James at Waterfront Auto

- Customer
  - Robert Smith
  - 2022 Acme Aero
    - Purchase date—Jan. 6, 2022
    - Service dates—vector
    - Other interaction dates and parties
    - Sold by—Joseph James
    - Finance—XXX
    - Service Advisor
  - Survey history-collection of surveys
    - When requested
    - Did he open
    - Did he complete
      - All results and verbatims
- Transaction
  - Sales/Service/Parts/Inquiry
  - Date
  - Served by
  - Details related to transaction
    - Vehicle bought-year/make/model
    - Date
    - Related events—e.g., test drive, online inquiry, etc.
      - And their related details
    - Price
    - VIN
    - Sales agent
    - Finance liaison The following is an example of a Waterfront Auto employees list including a list of candidate employees for which probabilistic matching to the extracted named entity is to be performed.

Joseph James
Joe Newton
Joey Daniels
Jeff Thompson
Debbie Adams

In this example, the following example factors are determined based on the above extracted information, as well as candidate employee information. The below factors include those that are assigned, for example, a value of "1" (as having been found to be true), based on a comparison of the extracted name to a candidate employee name, as well as a comparison of various attributes from the review and CRM data.

- Customer first name match-nickname
- Customer last name match
- Vehicle make match
- Vehicle model match
- Location match
- Review within 7 days
- Agent first name (nickname) match to multiple employees without a last name match In some embodiments, the employee attribution algorithm/model picks up each of these factors, and leveraging a machine learning model (such as logistic regression) applies a weight to each. In this case, the algorithm may assign a 95% probability that this review relates to employee Joseph James, a 2% probability each for employees Joe Newton and Joey Daniels (e.g., based on agent first name (nickname) match to both those employees, without the last name matching), and a 1% probability that it was an unknown employee.

As shown in the above examples, as much data as is possible is pulled from multiple sources, such as CRM data (if able to be identified), data extracted from the review being evaluated, etc. and used to determine the matches that are used to generate the attribution vector. The confidence from the model will change depending on what information is available, as well as the type and number of matches that can be made or not made among the aggregated information.

As described above, in various embodiments, employee attribution includes the following:

- A determination as to whether a name in text of a feedback item matches (with high confidence) to an employee.
- In some embodiments, if a high confidence match based on employee name cannot be found, it is determined whether a high confidence match to customer and CRM data for a particular event/transaction/service date (e.g., using probabilistic feedback attribution) can be found. That data may then be used to identify employees.

Other aspects and embodiments of employee attribution include:

- Inferring employees at a location from history of reviews for that location
- In some embodiments, distinguishing between a person name and an organization name
  - NER from spacy3 may have difficulty handling items such as car models, department names
    - In some embodiments, a taxonomy is used
  - This may be more difficult to achieve for departments
- In some embodiments, data will vary by industry
  - For auto, departments may be financing, service, sales, etc.
  - For healthcare, may be doctor specialties matched to
- In various embodiments, the use of CRM data opens up what can be matched to
  - Dates, departments, type of car, type of service
  - Sales—may have more than one person to match to (sales person, finance person)

Figure 7:
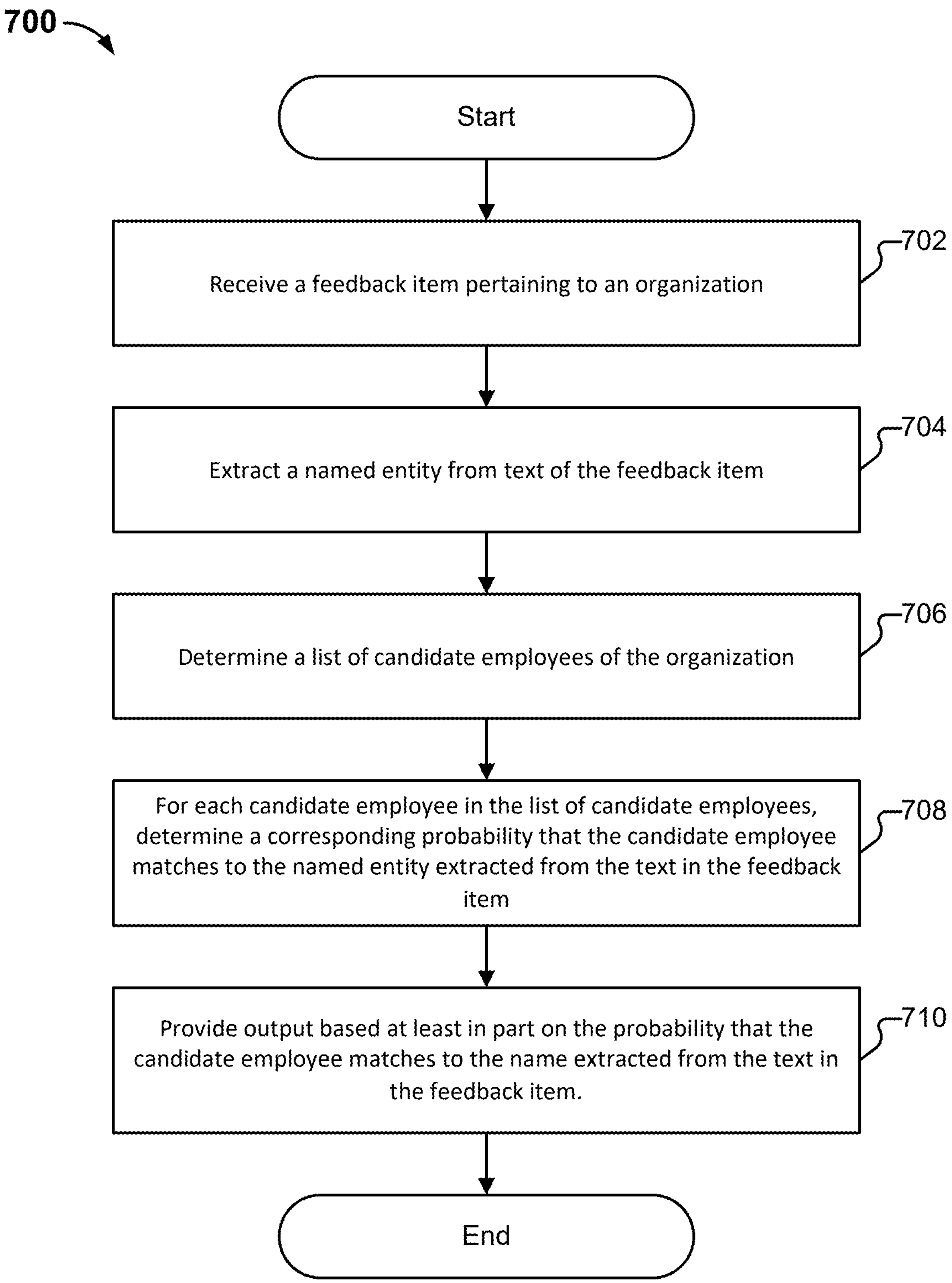
FIG. 7 is a flow diagram illustrating an embodiment of a process for employee attribution.

FIG. 7 is a flow diagram illustrating an embodiment of a process for employee attribution. In some embodiments, process 700 is executed by platform 502 of FIG. 5. The process begins at 702 when a feedback item pertaining to an organization is received. In some embodiments, the feedback item includes text. At 704, a named entity is extracted from text of the feedback item. At 706, a list of candidate employees of the organization is determined. In some embodiments, the candidate employees included in the list are those that are/were active in an interval of time associated with the feedback item. At 708, for each candidate employee in the list of candidate employees, a corresponding probability that the candidate employee matches to the named entity extracted from the text in the feedback item is determined. At 710, output is provided based at least in part on the probability that the candidate employee matches to the named entity extracted from the text in the feedback item.

Macro-Attribution of Feedback to Requesting

One goal of businesses is to generate additional reviews about their business. In some cases, in order to do so, businesses will reach out to their customers after those customers have visited them, asking them for feedback and inviting them to, for example, write a review about the business. However, it can be difficult to measure whether that activity of soliciting or requesting reviews actually impacted the volume of reviews or other feedback items that are being generated.

Described herein are techniques for macro-attribution of feedback to solicitation. While the probabilistic feedback attribution described above probabilistically attributes a specific piece of feedback to an individual, in various embodiments, the macro-attribution techniques described herein provide for larger-scale, overall attribution of feedback to solicitation.

Using the macro-attribution techniques described herein, the impact of solicitation on volume of feedback items being generated may be determined. In some embodiments, this includes determining whether a solicited person left a piece of feedback such as a review. Further, the probability that a given piece of feedback was generated as a result of solicitation may be determined. Using the macro-attribution techniques described herein, it may be determined whether a request or invitation to leave feedback caused the user to author the feedback, or whether the individual would have left the feedback regardless (i.e., organically, even without solicitation).

Using the probabilistic feedback attribution described above, the likelihood that individuals left a piece of feedback (or otherwise attributed to the particular piece of feedback) may be determined. For an individual that was determined, with high confidence, to have left a piece of feedback, the system may also determine whether that individual was solicited to leave feedback (e.g., to write a review).

While the user who left a piece of feedback may also be determined to have been asked to write a review, this does not necessarily mean that the solicitation caused the leaving of the review. For example, at a macro-level, it is uncertain whether that individual would have written a review anyway (e.g., left the review organically). At the same time, there may be individuals that have been solicited to write reviews, but there is not a direct link that would attribute that individual to a specific review or piece of feedback. For example, it may be the case that the solicitation included a unique link to post a review, but the user did not click the link, and left a review on their own (and thus the system does not have a direct record or click trail linking the solicitation to a review via the click through). In this case though, the user may have been influenced by the request, but this would not be known to the platform. As another example, an individual may leave a review at a much later time or on their spouse's account, and thus the feedback attribution processing described above is unable to associate the individual with the review. However, in these cases, requesting did in fact impact (either explicitly or implicitly) and cause the review.

In some embodiments, performing macro-attribution includes determining overall trends in requesting of feedback and collection of feedback. The techniques described herein may be adapted to accommodate macro-attribution analysis of locations of a multi-location entity.

In some embodiments, performing macro-attribution includes determining a time series distribution of the flow of feedback that is expected for various entities (or locations of a multi-location entity). As solicitations are introduced (e.g., emails, requests, messages, other types of invitations), the impact of the solicitations on the flow of feedback over time is modeled.

In some embodiments, performing macro-attribution includes determining an expected impact of solicitation on the volume of feedback that is generated. In some embodiments, the macro-attribution techniques described herein include determining the impact of solicitation on the sentiment of feedback (e.g., that are determined to have been influenced by the solicitation). For example, via the macro-attribution analysis described herein, the impact of solicitation on activating a "silent majority" (e.g., those individuals who left feedback because of solicitation, but otherwise would not have), both in terms of feedback volume and sentiment, may be determined.

As one example, consider a business such as that of a dentist. Oftentimes, when a dentist cleans a person's teeth, and the person is content with the cleaning, that person typically does not write a review about the experience of their annual cleaning at the dentist. However, inviting them to leave feedback on their experience may encourage such a silent, contented person to leave positive feedback about their experience. This will result in the dental office generating a greater volume of positive feedback about their business. For example, if people are not requested to post online feedback, oftentimes it is the angriest people that are the most willing to go to the greatest lengths to leave feedback. This results in a biased, negative feedback.

Figure 8:
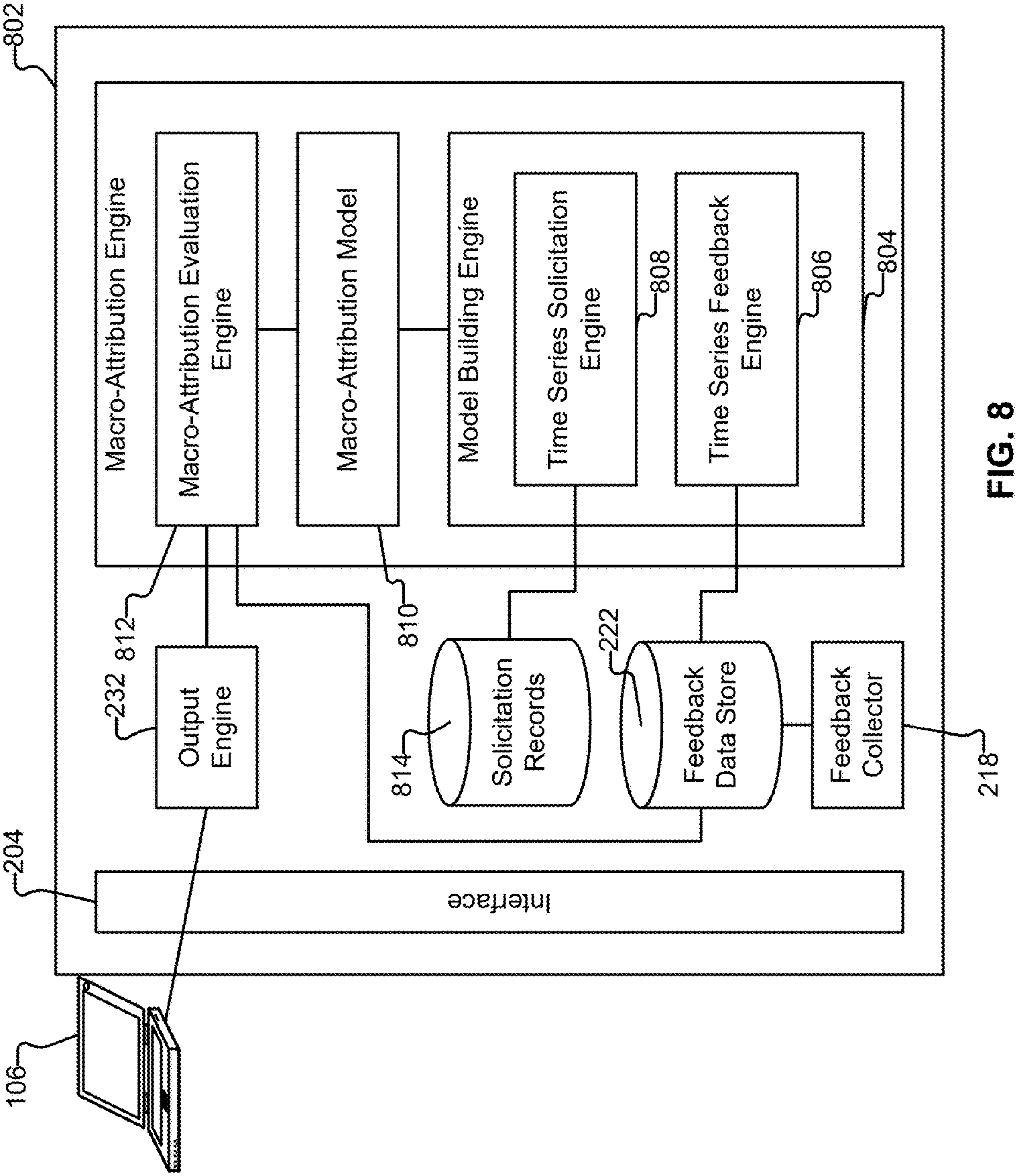
FIG. 8 illustrates an embodiment of a system for performing macro-attribution of feedback to solicitation.

FIG. 8 illustrates an embodiment of a system for performing macro-attribution of feedback to solicitation. In some embodiments, platform 802 is an alternate view of platforms 102 of FIGS. 1 and 502 of FIG. 5.

In this example, macro-attribution model building engine 804 is configured to build macro-attribution model 810. In some embodiments, macro-attribution model building engine 804 includes time series feedback engine 806 and time series solicitation engine 808.

In this example, time series feedback engine 806 is configured to determine historical time series information pertaining to the feedback pertaining to an entity. For example, a time series of the number of pieces of feedback that are received for an entity on various source sites over various periods of time is generated. Such time series information may be generated periodically (e.g., daily). The time series information may include various statistics regarding trends in feedback for a location over time.

Time series solicitation engine 808 is configured to determine historical time series information pertaining to solicitation. For example, a time series of the number of requests that have been sent out over various time periods is generated. The time series information may be obtained from solicitation records 814. The time series information may include various statistics regarding trends in solicitation for a location over time. For example, the statistics may include the number of requests that are being sent out per day. The solicitations may include requests for feedback from customers. In some embodiments, the requests include links that a customer may click on in order to leave feedback on a source site. Time series information pertaining to the requests may also be determined, such as click-throughs (e.g., the number of links that were clicked on), the number of individuals that clicked on specific links to sources (where different requests may include links to different sources sites, or a single request may include links to multiple sources sites), etc.

Model building engine 804 is configured to use the historical time series information pertaining to feedback items and solicitation to build macro-attribution model 810. For example, the historical time series solicitation information is layered on top of the historical time series feedback information. In some embodiments, the model building is performed periodically (e.g., daily). This allows the model to be updated over time. In this way, the platform monitors, for each day (or on any other time driven basis as appropriate), a time series of data that observes the number of new pieces of feedback that are being generated, as well as the number of new requests that are being sent out.

As one example implementation, the platform creates a data table (or any other data structure as appropriate), on any given day (or any other unit of time, as appropriate), that includes how many reviews have been generated, the number of reviews generated the day before, the average number of reviews daily over the last month for various locations, data on daily trends, etc. The data table also includes request information, such as the number of requests sent out one day, the number of requests sent out the previous day, the number of requests that were clicked on a given day, the number of requests that were clicked on the previous day, etc.

Using this time series information of generated feedback and transmitted requests as factors, the platform builds macro-attribution model 810. In various embodiments, the model is a regression type model or time-series type model. In some embodiments, the model is used to predict how much each of the factors of the model impacts the expected number of feedback items generated the next day. In some embodiments, macro-attribution model 810 is configured to determine an expected amount of feedback generated for a period of time.

Additional processing may be performed on the feedback data and the request data. For example, based on natural language processing (NLP) analysis, feedback may be segmented according to categories such as sales and service. Requests may also be segmented, such as those requests for sales customers, and those requests for service customers. Based on the macro-attribution processing described herein, the number of clicks observed for sales versus service and the expected impact of those clicks on different types of requests on feedback volume may be determined.

The macro-attribution model (or models) may further be improved based on CRM system information. For example, normalization may be performed based on determining the trendlines of the number of customers that are coming in for sales and service appointments. For example, the platform may determine or estimate an overall percentage of customers that leave feedback, and then use that estimate to determine a baseline expected number of organic reviews for a given time period. As one example, the platform may predict, based on historical trend information, that on average 1% of all customers leave a review. The macro-attribution model may then include a factor for the baseline expected number of organic reviews as 1% of customers for a given day. In this way, a baseline expected number of organic reviews may be determined and then used as described herein.

As another example, via the CRM integration described above, the type of CRM event that initiated a request may be determined (e.g., that a request was for an oil change, another request was sent out after a regularly scheduled service, etc.) and used to segment or bifurcate the requests during macro-attribution processing to determine the impact of each type of event.

In some embodiments, performing macro-attribution includes determining a baseline, or a priori understanding of feedback volume for various locations. In some embodiments, seasonality is also factored into the macro-attribution (e.g., to account for instances where locations may receive fewer reviews on the weekends as compared to weekdays).

In some embodiments, the models used for performing macro-attribution are calibrated according to characteristics of the locations, such as their size (e.g., where some dealers may be much larger than other dealers).

In some embodiments, the macro-attribution model is implemented via machine learning or regression. The following are embodiments of a macro-attribution model.

As one example, the macro-attribution model is used to determine the expected volume of feedback for any location over time.

In some embodiments, the model takes as input a data structure such as a table. The input table includes time series information regarding historical feedback, as well as historical requests for feedback.

In some embodiments, the model provides, as output, an expected volume of feedback for a location for a given time period.

Example of Building a Macro-Attribution Model

The following is an example of generating the macro-attribution model and determining an expected volume of feedback for a location for a given time period.

The following are examples of input variables provided to the macro-attribution model being built:

- The number of requests for feedback transmitted on a certain day
- The number of clicks that were received that day
- The number of requests that were made the previous day
- The number of clicks that were received the previous day
- The number of requests and clicks the previous week
- The number of reviews received the previous day
- The average number of reviews that were received of the previous month
- An indication of seasonality, such as the day of the week for which the expected volume is being predicted In some embodiments, a regression model is built on top of such data to estimate the impact of each of the above factors on feedback volume for a given day.

As output, the model provides, for any given day (based on the amount of feedback from the day before, the average daily feedback volume over the previous month, the volume of requests generated this week, etc.) the expected volume of feedback that would be generated on this day.

In some embodiments, the model also provides as output a measure of the impact of each of the factors on the predicted volume of feedback for that day (e.g., the amount by which the clicks from today impacted today's expected feedback volume, the amount by which the clicks from yesterday impacted today's expected feedback volume, etc.).

Macro-attribution evaluation engine 812 is configured to determine, for a set of feedback items received for a certain time period, an estimate of the number of feedback items in the received set of feedback items that were generated organically, as well as an estimate of the number of feedback items in the received set of feedback items that were generated by solicitation. In some embodiments, the estimates are based on the results of running the macro-attribution model for that certain time period.

Sentiment Analysis of Feedback Generated by Solicitation

As described above, the macro-attribution model may be used to facilitate understanding of how many more pieces of feedback are being generated due to requests for feedback being sent out. In some embodiments, a sentiment model is layered on top of the macro-attribution model to determine or model, for example, the expected average sentiment of the baseline feedback and determine the amount by which sentiment changed when the additional reviews were generated based on requesting. This may be used to obtain a model for the average sentiment of people that were inspired or influenced by requests, versus those people that would have organically left a piece of feedback.

Merging Macro-Attribution and Probabilistic Feedback Attribution

In the above examples of macro-attribution, overall attribution of feedback volume to feedback solicitation/requesting is determined. In some embodiments, the macro-attribution may be combined with the above probabilistic feedback attribution (which probabilistically determines, for a specific piece of feedback, the likelihood that a particular individual left that feedback).

As described above, using probabilistic feedback attribution, the system probabilistically determines the likelihood that an individual left a specific piece of feedback. In various embodiments, the macro-attribution analysis described herein uses a second model to determine a more generalized or overall expectation of how much feedback volume will be generated given a set of factors.

The feedback attribution model and the macro-attribution models described herein may be merged. This allows for attribution of feedback to solicitation to be determined not only at an aggregate, global, or macro level across a set of feedback items, but also perform attribution at the level of a specific piece of feedback. The information about specific pieces of feedback may also be used to improve the accuracy of the macro-attribution model. The following are examples of merging feedback attribution processing with macro-attribution.

As one example, by understanding more which specific individuals left feedback, this information may be fed back to update and generate a more advanced macro-attribution model for estimating an expected amount of feedback volume.

In some embodiments, the probabilistic determination of who left a piece of feedback is matched against the list of those individuals that were sent a request for feedback. Such information may be used to improve the estimation of the number of reviews that were generated based on requesting.

Further, the macro-attribution model may be used to determine, for a given set of feedback, which subset of feedback was caused by solicitation, and what subset of feedback would have been generated organically.

In some embodiments, this includes probabilistically determining, based on the probabilities of who left what feedback, the probability that any given piece of feedback was generated by requesting. In some embodiments, without such feedback-level information, it may be difficult to determine which specific, individual pieces of feedback were organically generated, and which were generated by solicitation. Rather, a more general, macro-level attribution, or a more general assessment is determined at the level of an overall set of feedback items, where some portion of the feedback items is predicted to have been organically generated by solicitation, without specifying or identifying specific feedback items that fall into either category.

By layering on top feedback attribution information, further information about each specific piece of feedback can be received and used to determine, on a per-feedback item basis, whether that particular feedback item was generated organically or by solicitation.

In some embodiments, the average sentiment of the subset of feedback that is estimated to have been generated by solicitation versus the organically left feedback is further analyzed to determine the impact of solicitation on feedback sentiment (e.g., does it result in improved sentiment).

As another example, suppose that 20 reviews were generated on a particular day. Probabilistic feedback attribution is performed to probabilistically map each review to an individual. In this example, suppose that 20 individuals (one for each review) were identified with high confidence as having left the 20 reviews that day (all reviews were probabilistically attributed to known individuals).

Based on a match against the list of individuals to which requests for feedback were sent, suppose in this example that it is determined that 15 of the 20 identified people had been sent requests (e.g., 15 of the probabilistically identified individuals had been sent review requests according to their records), and that the other 5 people had not been sent requests.

The five reviews for which the individuals had not been sent requests are assigned a 0% probability of having been caused or otherwise impacted by requesting (because the individuals never received a request, and they could not be influenced by requesting). These reviews are determined to have been generated organically.

Consider now the other 15 reviews that are attributed to individuals that were determined to have been sent requests. For illustrative purposes, suppose that all of the 15 individuals had clicked on links embedded in the requests to leave feedback.

For the subset of 15 reviews that are mapped to individuals that had been sent requests, the platform then determines a probability that a review in the subset of 15 reviews was generated in response to requesting (that is, by solicitation), and/or a probability that a review was organically generated (and would have been left even without requesting).

Suppose that the macro-attribution model estimates that, for that day, 10 reviews would be generated due to requesting. Based on this, of the 15 reviews, it is determined that 10 reviews were generated due to requesting, and that the remaining 5 reviews were generated organically (and not specifically caused by the requesting).

In this example, 10 out of 15, or ⅔ or 67% of the reviews (whose authors had been sent review requests) were predicted to have been caused by review requesting. The model then assigns each of the reviews in the subset of 15 reviews a probability of 67% that the review was impacted by requesting.

By understanding those individuals that were influenced by the requesting, an improved understanding of the macro-attribution model may be obtained. For example, the impact of requesting on overall sentiment may be determined.

For example, it was determined that there was a 67% probability that any of the reviews in the subset of 15 reviews was influenced by requesting. In some embodiments, the weighted average of the rating for each of the 15 reviews is determined. In this example, because there may not be sufficient information to determine which 10 specific reviews were generated due to requesting, all of the weights are the same for the 15 reviews (same 67% probability), and thus the average sentiment is the same as the average sentiment of the 15 reviews.

In some embodiments, as the system becomes more probabilistically confident in determining individuals that were influenced by review requesting and those that were not, the various models may be updated.

For example, in the above example, all reviews in the 15 reviews were assigned an equal probability of 67% (e.g., based on the macro level estimation that 10 reviews were expected to be generated based on requesting according to the model). However, over time, the system may estimate, on a per-individual basis, an individual likelihood that a user was influenced by review requesting. For example, one person may have a 90% probability of having been influenced, while another person may have a 50% probability of having been influenced by requesting. This may be used to weight the individual reviews (based on who is determined to have left them, probabilistically), and determine a weighted average of the sentiment of the reviews, where the ratings of each piece of feedback may vary based on the identified author of the feedback (versus applying a macro-level equal probability across all feedback items).

In the above example, the output of the feedback attribution model (used to determine who wrote what) may be added to the macro-attribution model to determine the expected sentiment of feedback that was generated by requesting, and the expected sentiment of feedback that was generated organically.

Updating of the Macro-Attribution Model

As described above, the macro-attribution model may be used to determine a volume of reviews expected to be generated in a given day. In some embodiments, the macro-attribution model may be updated. For example, once that day occurs, and actual reviews for that day are collected, this information on the actual number of generated reviews may be added back to the macro-attribution model via an additional input variable.

As one example, an input variable/factor is included in the model that corresponds to the overall number of those pieces of feedback that were attributed to an individual that was sent a request (determined according to the probabilistic feedback attribution described above that probabilistically attributes a specific piece of feedback to an individual).

In the above example, 15 reviews fit this criteria, and are thus provided as an input as historical information to the model (e.g., included as an input when rebuilding the model the next day). The feedback loop formed by providing such information as input is used to update (e.g., retrain) the macro-attribution model, which may then provide improved future estimates (or for the same day to adjust its estimate).

Example Outputs

The following are examples of outputs and actions that may be taken by the system based on the macro-attribution modeling. In some embodiments, the output is provided via output engine 232.

As one example, the quantitative impact of requesting may be determined. For example, the increase in volume of feedback being generated by requesting may be quantified and presented (e.g., by determining the contributions of factors that are related to requesting).

As another example, the impact on online sentiment for locations may be quantified as well. This allows users to understand the impact of requesting, as well as the return on investment (ROI) of performing requesting.

As described above, the techniques described herein may be used to probabilistically determine feedback that was generated organically, and feedback that was generated by requesting.

The sentiment of organically generated behavior may be compared with the sentiment of feedback generated by requesting.

Normalization may be performed to perform comparisons of relative sentiments of customers at different locations. As another example, by understanding the temporal trends of organically generated feedback and feedback generated by requesting, anomaly detection may be performed. For example, solicited sentiment may be compared against unsolicited (organic) sentiment to perform anomaly detection (e.g., because the difference between solicited and unsolicited sentiment exceeds a threshold). In this way, false reviews may be identified.

As another example, information about the types of requests that are made (e.g., service versus parts) may be included in the macro-attribution model and the impact of different types of requests on feedback sentiment may also be separately determined.

In some embodiments, a UI is provided by output engine 232 that allows users to view measurements related to macro-attribution analysis. For example, the average sentiment of organically generated reviews and the average sentiment of reviews generated by requesting may be presented. Various other information for a location may be presented via dashboards, such as, for a given time period, the number of requests, the number of clicks, the number of reviews, the number of reviews attributed to individuals, etc.

As described above, the macro-attribution model provides an understanding of the overall or macro-level attribution of feedback to requesting. The feedback attribution model provides specific attribution of feedback to individuals. These models may be combined to provide various types of analyses, as described above.

Additional Examples of Performing Macro-Attribution

The following is another example of performing macro-attribution.

The following is an additional example of inputs to the macro-attribution model.

- Location
- Source
- Date
- Day of Week
- Requests
- Clicks
- Previous day clicks
- Previous week clicks
- Average rating
- Previous four week average rating In some embodiments, the macro-attribution model is a regression that estimates the expected number of reviews for a given location/source/day of the week. As one example, several months of data for a location is provided. The model forms a regression for that location/source with factors for:

- Each day of the week—to obtain, for example, weekly seasonality
- Each month of the year—to, for example, account for any overall trends
- The number of overall requests
- The number of clicks on those requests
- The number of clicks the previous day
- The number of clicks the previous week In some embodiments, the first two components (e.g., each day of the week, each month of the year) yield a baseline estimate of the case where there was no requesting. The final four factors (time series information pertaining to solicitation, including the number of overall requests, the number of clicks on those requests, the number of clicks the previous day, and the number of clicks the previous week) may be aggregated to yield an expected impact of the requesting.

As one example, for a given dealer, Acme motors, on a given Tuesday in May (day of the week and month of the year), the above coefficients generated when building the macro-attribution model may be:

- Each day of the week—for example to obtain weekly seasonality (+0.5 for Tuesday)
- Each month of the year—to account for any overall trend (2.5 for May)
- The number of overall requests (0.01 per request)
- The number of clicks on those requests (0.1 per click) day)
- The number of clicks the previous day (0.02 per click from the previous week)
- The number of clicks the previous week (0.03 per click from the previous In this example, because of it being a Tuesday in May (day/month when this model is being run), three reviews (0.5+2.5 from the first two components) from a source (e.g., Google) are expected if there are no requests.

However, suppose that the location had sent 100 requests and received 10 clicks. They also received 10 clicks yesterday and 30 the previous week. Based on this, and the remaining four coefficients of the model, the macro-attribution model predicts or expects 100*0.01+10*0.1+10*0.02+30*0.03=3.1 additional reviews. That is, overall, 6.1 reviews are expected for that Tuesday in May according to the macro-attribution model (3 reviews from the first two factors, plus the 3.1 reviews from the last four factors=6.1 reviews expected in total for that Tuesday in May), where 3.1/6.1, or 51% of the feedback is expected to be generated by requests.

Suppose that there were actually 5 pieces of feedback received or collected or generated that day (that Tuesday in May). Based on the macro-attribution model, it is estimated that 51% of the 5 reviews, or 2.55 were generated by the requesting. This is one example of modeling the expected amount of reviews, in an overall set of reviews, generated by requesting. Various output and other types of processing may be performed based on this information, as described above.

In some embodiments, as an extension, every day over this period is observed, and a relationship is plotted between the percentage that is estimated to be generated by requests versus the overall average rating to obtain a best fit for the expected rating when feedback is generated organically versus via requesting.

The following is an example of how the output of the macro-attribution model can be merged with the probabilistic feedback attribution.

Suppose that probabilistic feedback attribution on the 5 received reviews has been performed. The macro-attribution model estimates that requesting generated 2.55 reviews on this day (that Tuesday in May). Suppose that in the feedback-level attribution, there were 4 attributed reviews (that is, 4 reviews attributed to individuals who were sent requests, while the last review was not attributed to an individual who was sent a request, and is thus determined to not have been impacted by requesting).

As one example, each of those 4 reviews (attributed to individuals that were also sent requests) is assigned a 2.55/4 or 64% chance of having been generated via requesting. The remaining review is assigned a 0% chance that it was generated via requesting.

In some embodiments, the system further looks at the date of the requests that are tied to those 4 attributed reviews, or the fact that some were generated via clicks and others were not, or observed that based on the rating or text of certain reviews, that those are more likely to have been generated via requesting. This may be used to adjust or modify the individual probabilities that a given piece of feedback was caused by requesting.

As another example, the number of attributed reviews on this date may be incorporated directly into the regression-based macro-attribution model, and based on whether the estimated percentage was higher or lower than what would have been normally expected, is used as another factor to update the estimate of how many reviews that requesting generated.

Figure 9:
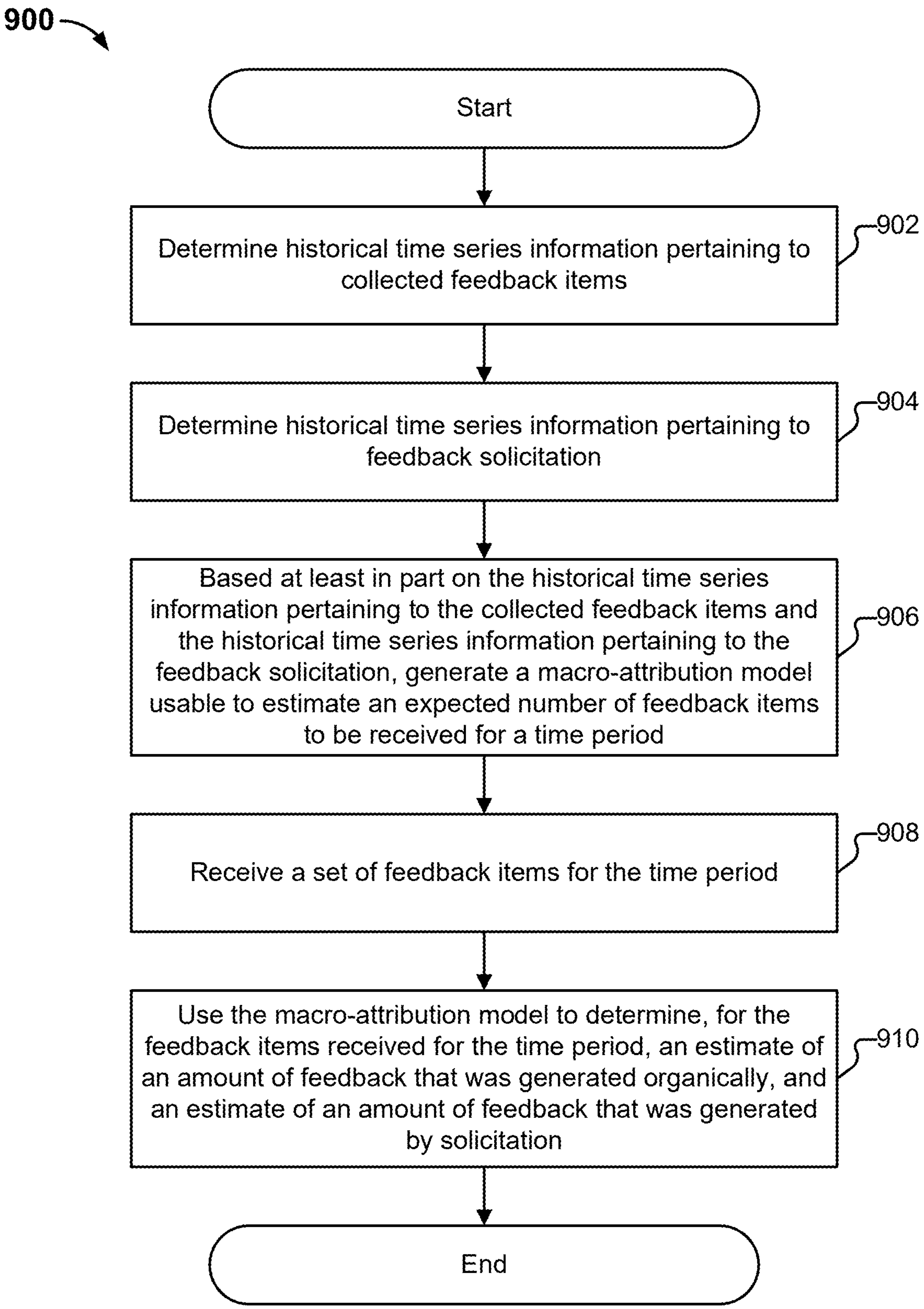
FIG. 9 is a flow diagram illustrating an embodiment of a process for macro-attribution of feedback to solicitation.

FIG. 9 is a flow diagram illustrating an embodiment of a process for macro-attribution of feedback to solicitation. In some embodiments, process 900 is executed by platform 802 of FIG. 8. The process begins at 902 when historical time series information pertaining to collected feedback items is determined. At 904, historical time series information pertaining to feedback solicitation is determined.

At 906, based at least in part on the historical time series information pertaining to collected feedback items and the historical time series information pertaining to feedback solicitation, a macro-attribution model usable to estimate an expected number of feedback items to be received for a time period is generated. In some embodiments, generating the macro-attribution model includes determining a baseline estimate of an amount of feedback items that are organically generated for the time period. In some embodiments, generating the macro-attribution model includes determining an amount of feedback expected to be generated by solicitation for the time period. In some embodiments, a percentage or proportion of feedback items received for the time period that are generated by solicitation is predicted or estimated using the macro-attribution model.

At 908, a set of feedback items for the time period are received. At 910, the macro-attribution model is used to determine, for the set of feedback items received for the time period, an estimate of an amount of feedback that was generated organically, and an estimate of an amount of feedback that was generated by solicitation. In some embodiments, the estimate of the amount of feedback that was generated by solicitation is determined using the predicted percentage of feedback items generated by solicitation determined by the macro-attribution model.

Additional Embodiments

Using Additional Feedback

In some embodiments, other feedback associated with an individual is used when performing probabilistic feedback attribution and determining a probabilistic mapping of an online feedback item to a set of individuals. Examples of such feedback information include their likelihood of leaving feedback or whether the individual has left similar feedback elsewhere (e.g., on other source sites).

For example, an individual coming to a dealership for the first time may have an X probability of leaving a review. Once the individual has become a customer and visited multiple times (e.g., 3-4 times), the propensity of reviewing is likely to decrease until the individual has a bad experience. As another example, reviews may be updated. In some embodiments, when such reviews are updated, the sequence of feedback update events are matched to a sequence of interactions between an entity and the individual.

In some embodiments, a model similar to that described above is used to assess the probability that employees, departments, locations, etc. are involved with a piece of feedback. In some embodiments, such a model is combined with the feedback attribution model described herein. For example, given that an individual has a certain probability of having left a piece of feedback, the probability that a certain employee is being referred to when the review says "service advisor" may be determined. For example, the service advisors that the individual has interacted with (e.g., according to CRM data) may be assigned a probability of being the service advisor that is discussed in the review.

Extending the Model

In some embodiments, the feedback attribution model described herein is extended with similarity scores for additional attributes (e.g., did the leaver of the feedback item mention "service"). Knowing that an interaction of type service was performed, this can be an additional variable in the model (where a logistic regression may be trained to provide a weight to score on this component).

Macro-Attribution

In some embodiments macro-attribution includes determining how much online feedback does solicitation generate. In this case, rather than attributing a feedback item to a person, online feedback is probabilistically attributed to requesting/solicitation in general.

The following is one embodiment of an approach to macro-attribution. In this example, the overall volume of customer interactions over time is observed, and it is determined how the overall volume of customer interactions over time relates to a volume of feedback. In some embodiments, once customers (e.g., customers of an entity such as AutoBest) are surveyed, it is determined how the volume of reviews changes (e.g., increases, decreases, stays the same, etc.). In some embodiments, this includes the following example steps. Time series analysis is performed to estimate the impact of surveys. In some embodiments, this includes estimating how many pieces of feedback (e.g., reviews) surveying generates on various platforms (e.g., source sites). It is also estimated or otherwise determined how surveying impacts sentiment. For example, it may be observed that there is generally higher sentiment among this "silent majority."

In some embodiments, it is determined whether customers "clicked" and the impact that this has. For example, customers who click may be observed to be more likely to leave a review. In some embodiments, customers are also segmented. For example, it may be determined that customers who buy a car are more likely to click a review than customers who came for other types of transactions such as a service appointment. In some embodiments, a series of models is used that determines a probability that any request will generate a review.

In some embodiments, the macro-attribution techniques are applicable to all types of online feedback, where requests may indirectly generate feedback anywhere. For example, a person may receive a survey, but choose not to respond, and instead leave feedback on a platform/source site.

In some embodiments, experimentation and performed, and there are extensions to the macro-attribution described above. For example, the macro-attribution processing may be randomized by location to validate models of how much requesting impacts review volume and sentiment. Further, in some embodiments, the models used supply or otherwise provide a lagged distribution (e.g., how many reviews do requests generate in the same day, 1 day later, etc.) via lagged parameters.

Merge

In some embodiments, merging is performed to determine the probability that each piece of online feedback was generated by solicitation. For example, using the feedback attribution techniques described herein, platform 102 is able to determine (probabilistically) who left feedback. Platform 102 also knows if a person was solicited. In some embodiments, using this information, reputation platform 102 determines if the person wrote that feedback because they were solicited.

As a note, even if platform 102 sent someone a request and the person left feedback, this does not necessarily mean that they left the feedback because of the request. It is possible that the person would have left the feedback anyway, even if they had not been sent a request. In some embodiments, this is taken into consideration when determining the true impact of requesting. In some embodiments, the merging techniques are used to determine how much more online feedback does requesting generate, as well as how requesting impacts the sentiment of online feedback.

In some embodiments, the above are determined probabilistically (as it may not be possible to know with absolute certainty what caused every person to leave feedback, as the person themselves may not even know).

The following is an example of an approach for determining that a piece of online feedback was generated by solicitation. From the above, platform 102 determines how much feedback solicitation is expected to generate, as well as how much more positive the feedback should be. Each piece of feedback in a group of feedback is evaluated to determine how a given feedback item should be (probabilistically) bucketed. In some embodiments, using a first model, each piece of feedback is assigned a probability that the writer or leaver of the feedback was even solicited. In some embodiments, using a second model, a posterior distribution is assigned of how much organic and solicited feedback is expected. In some embodiments, the posterior distribution and the probabilities that a writer was even solicited are combined together to generate a posterior probability that each piece of feedback was generated by solicitation. In some embodiments, a stochastic model is used/optimization is performed to obtain a best-fit posterior distribution on every review to match observed results over time.

Thus, in some embodiments, reputation platform 102 determines the probability that a piece of online feedback was generated by solicitation (review requesting). For example, using the probabilistic feedback attribution techniques described above, platform 102 determines, probabilistically, for a set of individuals, who left feedback. Platform 102 also knows which of those individuals were solicited. Using these two pieces of information, platform 102 can determine the probability that an individual who was solicited wrote a piece of feedback because they were solicited. The impact and sentiment of the solicitation may then be parsed out or otherwise determined. As described above, determining the probability of leaving feedback due to solicitation includes determining whether a user who was solicited would have left a piece of feedback anyway. As described above, in some embodiments, performing this determination includes using another model to solve a stochastic optimization problem to determine a distribution on an amount of feedback that was generated by a set of requests. This provides an estimate of how likely that pieces of feedback were generated because of the solicitation, as well as who wrote it. For example, in some embodiments, platform 102 assesses the probability that the user would have written the review anyway if they had not been solicited.

The following are example extensions of merging. The merging techniques described above may be variously adapted to accommodate any types of request interactions, such as review requests, follow-up phone calls, etc. In some embodiments, individuals/customers of an entity are further broken out or segmented, for example, by interaction type (e.g., sales versus service). Further, individuals or customers may be associated with portion of a "journey" that they are on, such as being a first time car buyer or other parts of the journey. Various journey analytics may then be determined. Customers and individuals may further be broken out by social, demographic, and/or economic factors. In some embodiments, based on the aforementioned level of modeling, experimentation and testing may be performed to validate the models, for example by soliciting only half of users/individuals.

In some embodiments, impact is determined. By performing the above, true customer satisfaction and how it trends over time may be better understood. In some embodiments, normalization is performed. For example, normalization of organic feedback is performed over time and by location. Normalization of overall feedback may be performed, for example, by extrapolating to a remainder of a silent majority. Normalized customer satisfaction may also be determined, which includes determining a baseline. This may include normalizing across parts of the journey, normalizing by customer segment, normalizing for other bias presented by a source of feedback, etc.

In some embodiments, platform 102 determines how much feedback was generated (e.g., by tracking feedback volume), and is able to determine (probabilistically) who left that feedback (e.g., using the feedback attribution techniques described above). The individuals may be segmented by user type and their place in a journey. In some embodiments, baseline organic feedback may be determined by feedback type. Impact by group/journey may also be determined. The relative satisfaction of each group in each part of the journey may also be determined. In some embodiments, based on where a user is on a journey, recovery flows are also established (e.g., in case negative feedback is received).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory; and one or more computer processors coupled to the memory and configured to:

collect feedback items over a network, including using a web scraper to scrape a source site for a feedback item pertaining to an entity based at least in part on a determination that querying of the source site using an Application Programming Interface (API) is unavailable for the source site;

receive historical time series information pertaining to the collected feedback items;

receive historical time series information pertaining to feedback solicitation;

based at least in part on the historical time series information pertaining to the collected feedback items and the historical time series information pertaining to the feedback solicitation, generate, using the one or more computer processors, a macro-attribution model usable to estimate an expected number of feedback items to be received for a given time period, wherein generating the macro-attribution model comprises:

generating, from the historical time series information pertaining to the collected feedback items and feedback solicitation, one or more data structures that include numbers of feedback solicitation requests that were made, and numbers of feedback items received, for a plurality of different previous time periods relative to the given time period; and providing the generated one or more data structures as input to the macro-attribution model;

receive a set of feedback items for the given time period; and use the macro-attribution model to determine, for the set of feedback items received for the given time period, at least one of an estimate of a volume of feedback items in the received set of feedback items that was generated organically or an estimate of a volume of feedback items in the received set of feedback items that was generated by solicitation.

2. The system of claim 1, wherein the macro-attribution model comprises a first set of components pertaining to seasonality.

3. The system of claim 2, wherein the estimate of the volume of feedback items in the received set of feedback items that was generated organically is based at least in part on a contribution of the first set of components pertaining to seasonality.

4. The system of claim 2, wherein the first set of components pertaining to seasonality comprises at least one of a day of a week or a month of a year.

5. The system of claim 1, wherein the macro-attribution model comprises a set of components pertaining to solicitation.

6. The system of claim 5, wherein the estimate of the volume of feedback items in the received set of feedback items that was generated by solicitation is based at least in part on a contribution of the set of components pertaining to solicitation.

7. The system of claim 5, wherein the set of components pertaining to solicitation comprises at least one of a number of requests or a number of clicks.

8. The system of claim 1, wherein the one or more computer processors are configured to use the macro-attribution model to determine a predicted proportion of the received set of feedback items that is expected to have been generated by solicitation.

9. The system of claim 1, wherein the one or more computer processors are further configured to determine, for at least one feedback item in the received set of feedback items, a probability that the feedback item was generated by solicitation.

10. The system of claim 1, wherein the one or more computer processors are configured to determine an aggregate sentiment of feedback items generated by solicitation.

11. The system of claim 1, wherein the one or more computer processors are further configured to determine, for at least one feedback item in the received set of feedback items, a probability that the at least one feedback item is attributed to an individual.

12. A method, comprising:

collecting feedback items over a network, including using a web scraper to scrape a source site for a feedback item pertaining to an entity based at least in part on a determination that querying of the source site using an Application Programming Interface (API) is unavailable for the source site;

receiving historical time series information pertaining to the collected feedback items;

receiving historical time series information pertaining to feedback solicitation;

based at least in part on the historical time series information pertaining to the collected feedback items and the historical time series information pertaining to the feedback solicitation, generating, using one or more computer processors, a macro-attribution model usable to estimate an expected number of feedback items to be received for a given time period, wherein generating the macro-attribution model comprises:

generating, from the historical time series information pertaining to the collected feedback items and feedback solicitation, one or more data structures that include numbers of feedback solicitation requests that were made, and numbers of feedback items received, for a plurality of different previous time periods relative to the given time period; and providing the generated one or more data structures as input to the macro-attribution model;

receiving a set of feedback items for the given time period; and using the macro-attribution model to determine, for the set of feedback items received for the given time period, at least one of an estimate of a volume of feedback items in the received set of feedback items that was generated organically or an estimate of a volume of feedback items in the received set of feedback items that was generated by solicitation.

13. The method of claim 12, wherein the macro-attribution model comprises a first set of components pertaining to seasonality.

14. The method of claim 13, wherein the estimate of the volume of feedback items in the received set of feedback items that was generated organically is based at least in part on a contribution of the first set of components pertaining to seasonality.

15. The method of claim 13, wherein the first set of components pertaining to seasonality comprises at least one of a day of a week or a month of a year.

16. The method of claim 12, wherein the macro-attribution model comprises a set of components pertaining to solicitation.

17. The method of claim 16, wherein the estimate of the volume of feedback items in the received set of feedback items that was generated by solicitation is based at least in part on a contribution of the set of components pertaining to solicitation.

18. The method of claim 16, wherein the set of components pertaining to solicitation comprises at least one of a number of requests or a number of clicks.

19. The method of claim 12, comprising using the macro-attribution model to determine a predicted proportion of the received set of feedback items that is expected to have been generated by solicitation.

20. The method of claim 12, further comprising determining, for at least one feedback item in the received set of feedback items, a probability that the feedback item was generated by solicitation.

21. The method of claim 12, comprising determining an aggregate sentiment of feedback items generated by solicitation.

22. The method of claim 12, further comprising determining, for at least one feedback item in the received set of feedback items, a probability that the at least one feedback item is attributed to an individual.

23. A computer program product embodied in a non-transitory computer readable storage medium and comprising computer instructions for:

collecting feedback items over a network, including using a web scraper to scrape a source site for a feedback item pertaining to an entity based at least in part on a determination that querying of the source site using an Application Programming Interface (API) is unavailable for the source site;

receiving historical time series information pertaining to the collected feedback items;

receiving historical time series information pertaining to feedback solicitation;

based at least in part on the historical time series information pertaining to the collected feedback items and the historical time series information pertaining to the feedback solicitation, generating, using one or more computer processors, a macro-attribution model usable to estimate an expected number of feedback items to be received for a given time period, wherein generating the macro-attribution model comprises:

generating, from the historical time series information pertaining to the collected feedback items and feedback solicitation, one or more data structures that include numbers of feedback solicitation requests that were made, and numbers of feedback items received, for a plurality of different previous time periods relative to the given time period; and providing the generated one or more data structures as input to the macro-attribution model;

receiving a set of feedback items for the given time period; and using the macro-attribution model to determine, for the set of feedback items received for the given time period, at least one of an estimate of a volume of feedback items in the received set of feedback items that was generated organically or an estimate of a volume of feedback items in the received set of feedback items that was generated by solicitation.

* * * * *

UNITED STATES PATENT AND TRADEMARK OFFICE

CERTIFICATE OF CORRECTION

PATENT NO. : 12,393,967 B1
APPLICATION NO. : 17/592205
DATED : August 19, 2025
INVENTOR(S) : Dean Mao et al.

It is certified that error appears in the above-identified patent and that said Letters Patent is hereby corrected as shown below:

In the Specification

In Column 2, Line(s) 56, after "dealerships", insert --.--.

In Column 4, Line(s) 63, after "Finance liaison", insert --...--.

In Column 24, Line(s) 67, after "Finance liaison", insert --...--.

In Column 25, Line(s) 59, after "Agent last name mismatch - 0", insert --...--.

In Column 27, Line(s) 32, after "Agent last name mismatch - 0", insert --...--.

In Column 34, Line(s) 29, delete "location uid:" and insert --location_uid:--, therefor.

In Column 45, Line(s) 20, after "Finance liaison", insert --...--.

In Column 45, Line(s) 30, after "Debbie Adams", insert --...--.

In Column 46, Line(s) 59, before "And", delete "A".

In Column 46, Line(s) 63, after "Finance liaison", insert --...--.

In Column 47, Line(s) 3, after "Debbie Adams", insert --...--.

In Column 48, Line(s) 35, after "Finance liaison", insert --...--.

In Column 48, Line(s) 44, after "Debbie Adams", insert --...--.

Signed and Sealed this
Second Day of December, 2025

John A. Squires
*Director of the United States Patent and Trademark Office*